United States Patent
Huntington et al.

(10) Patent No.: US 7,438,075 B1
(45) Date of Patent: Oct. 21, 2008

(54) SPRAY ARCH CONTROLLER FOR A CARWASH

(75) Inventors: Alan G. Huntington, Green Bay, WI (US); Peter T. Jensen, De Pere, WI (US); Kenneth R. Smith, Green Bay, WI (US); Buddy R. Starnes, Green Bay, WI (US); David C. Stock, De Pere, WI (US); Robert J. Harter, La Crosse, WI (US)

(73) Assignee: Washworld, Inc., DePere, WI (US)

( * ) Notice: Subject to any disclaimer, the term of this patent is extended or adjusted under 35 U.S.C. 154(b) by 667 days.

(21) Appl. No.: 11/027,226

(22) Filed: Dec. 30, 2004

(51) Int. Cl.
*B08B 3/00* (2006.01)
(52) U.S. Cl. .................. 134/57 R; 134/123
(58) Field of Classification Search .......... None
See application file for complete search history.

(56) References Cited

U.S. PATENT DOCUMENTS

| | | | |
|---|---|---|---|
| 3,038,481 A | 6/1962 | Brechtel | |
| 3,042,303 A | 7/1962 | Kendall et al. | |
| 3,596,241 A | 7/1971 | Migneault | |
| 4,665,378 A | 5/1987 | Heckethorn | |
| 4,719,932 A | 1/1988 | Burton | |
| 4,777,688 A | 10/1988 | Seamster, Jr. | |
| 5,161,557 A | 11/1992 | Scheiter, Jr. | |
| 5,188,293 A | 2/1993 | Burton | |
| 5,208,586 A | 5/1993 | Friberg et al. | |
| 5,329,949 A | 7/1994 | Moncourtois et al. | |
| 5,853,127 A | 12/1998 | Heembrock | |
| 5,886,648 A | 3/1999 | McElroy et al. | |
| 6,147,625 A | 11/2000 | Decker | |
| 6,218,962 B1 | 4/2001 | Fiene | |
| 6,372,053 B1* | 4/2002 | Belanger et al. | 134/34 |
| 6,425,407 B2 | 7/2002 | Jones et al. | |
| 6,509,964 B2* | 1/2003 | Wiles et al. | 356/237.2 |
| 6,547,156 B2 | 4/2003 | Jones | |
| 6,551,415 B2 | 4/2003 | Jones et al. | |
| 6,571,807 B2 | 6/2003 | Jones | |
| 6,571,824 B2 | 6/2003 | Jones et al. | |
| 6,595,221 B2 | 7/2003 | Jones et al. | |
| 6,769,440 B2 | 8/2004 | Jones et al. | |

FOREIGN PATENT DOCUMENTS

EP          0-507-757 A1    10/1992

* cited by examiner

*Primary Examiner*—Mikhail Kornakov
*Assistant Examiner*—Eric Golightly
(74) *Attorney, Agent, or Firm*—Robert J. Harter

(57) ABSTRACT

A carwash includes a single thru-beam or retroreflective photoelectric sensor that can determine the position of a vehicle's left side, right side, front end and back end. To accomplish this, the sensor is coupled to a spray arch that travels around the vehicle while spray washing the vehicle's exterior. In some embodiments, the sensor responds to a beam projected from an emitter that also travels with the spray arch, whereby the emitter, the sensor and the spray arch move in unison. The beam is preferably projected at an acute angle to a horizontal plane so that the sensor can detect the presence of the vehicle without the spray arch having to get too close. To avoid over twisting the sensor's electrical cable, the arch alternately rotates CW and CCW to limit cumulative rotation in any one direction. In some cases, the single sensor responds to beams from multiple emitters.

7 Claims, 18 Drawing Sheets

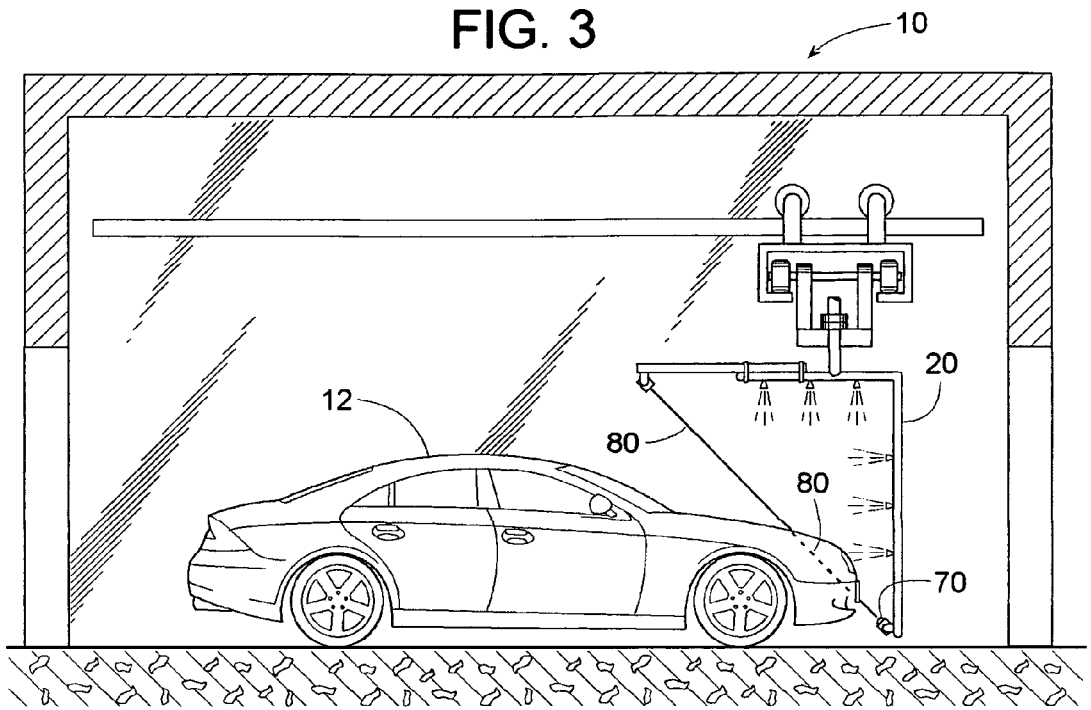
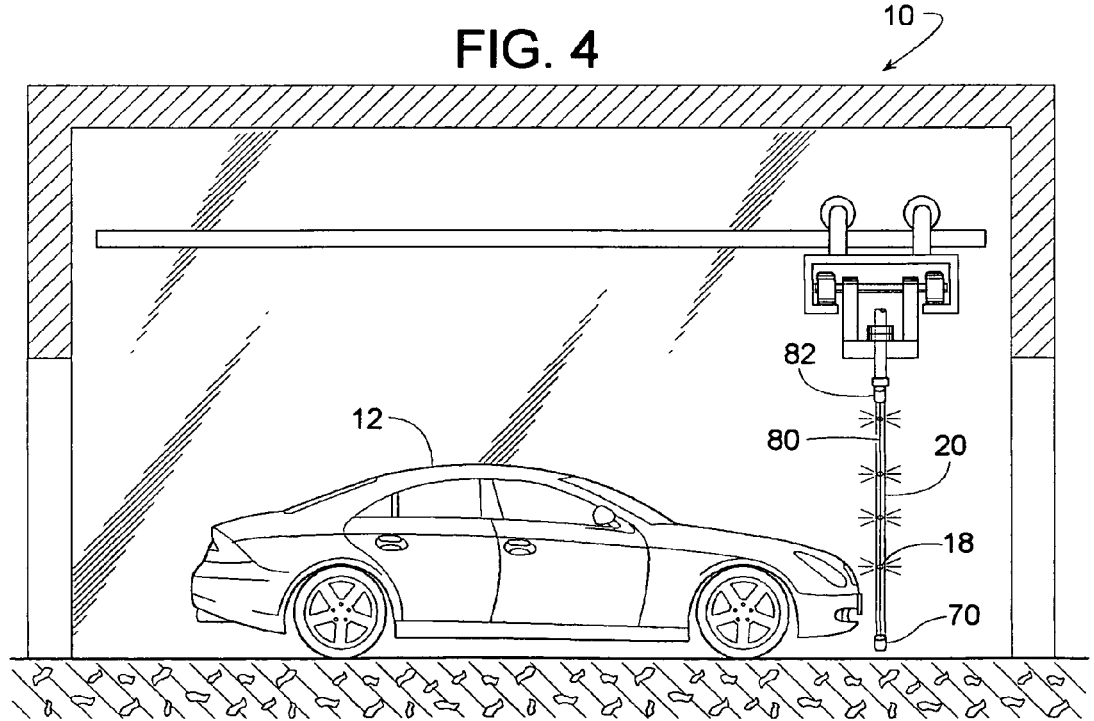

SPRAY ARCH CONTROLLER FOR A CARWASH

BACKGROUND OF THE INVENTION

1. Field of the Invention

The subject invention generally pertains to a carwash and more specifically to a system for controlling the path of a spray arch.

2. Description of Related Art

To wash a vehicle in what is known as a touchless automatic carwash, the vehicle is usually parked at a desired location within a wash bay. Once a tire-engaging treadle switch or some other sensor system determines that the vehicle is properly parked, a controller commands an overhead supporting structure to move one or more spray arches (or some other type of pipe with a series of spray nozzles) around the vehicle to sequentially spray various mixtures of water, soap, and other chemicals at a temperature and pressure sufficient to flush dirt and grime off the vehicle.

To maintain a desired spraying distance between the spray arch and the vehicle, the controller typically guides the movement of the arch in response to multiple additional sensors that determine the positions of the vehicle's exterior surfaces, such as the vehicle's front, back, right side, and/or left side. Examples of carwash systems that employ multiple sensors are disclosed in U.S. Pat. Nos. 6,425,407; 6,769,440 and 6,551,415

The various sensors of a carwash can be problematic due to the harsh environment in which they operate. Fog, water spray, dirt, strong chemicals, and ice are just a few of the common elements that can disrupt the operation of sensors. Many sensors may provide false signals due to vehicles of widely varying design where the exterior surface of the vehicle may vary by color, shape, material (e.g., plastic, metal, glass), reflectivity, height, angle, etc.

Consequently, there is a need for a system that can reliably control the path of a spray arch with a minimal number of sensors.

SUMMARY OF THE INVENTION

An object of some embodiments is to provide a spray arch and control system that uses a minimal number of sensors.

Another object of some embodiments is to use a single thru-beam sensor for determining the position of multiple surfaces of a vehicle.

Another object of some embodiments is to alternately rotate a spray arch clockwise and counterclockwise to limit its cumulative rotation, wherein the arch can be rotated in one direction more than 180-degrees, or more than 270-degrees, or perhaps even 360-degrees, without over twisting an electrical cable that may lead to an electrical component mounted to the spray arch and without having to rely on rotating electrical contacts.

Another object of some embodiments is to aim an inclined beam at a sensor that is mechanically coupled to a spray arch, wherein the vehicle can obstruct the beam before the sensor or the spray arch gets too close to the vehicle.

Another object of some embodiments is to have the beam projected at an angle of at least 20 to avoid shooting the beam through an open-sight opening in the vehicle and no more than 80 degrees so that the sensor and spray arch can stay a safe distance away from the vehicle.

Another object of some embodiments is to mount both a sensor and an emitter to a spray arch to maintain a fixed relationship between the two.

Another object of some embodiments is to mount just the sensor to the spray arch and an emitter at a stationary location, thereby reducing the number of electrical cables on the spray arch.

Another object of some embodiments is to use a single optical sensor (opposed mode or retroreflective mode) for detecting the location of both a right side and a left side of a vehicle.

Another object of some embodiments is direct the path of a spray arch such that the vehicle obstructs a beam for substantially the entire distance that the arch travels along the length of the vehicle, whereby a momentary failure in the sensor or emitter would not be a problem.

Another object of some embodiments is direct the path of a spray arch such that the vehicle obstructs a beam for substantially the entire distance that the arch travels along the width of the vehicle, whereby a momentary failure in the sensor or emitter would not be a problem.

Another object of some embodiments is to have a single sensor detect beams from different emitters.

Another object of some embodiments is to have a single sensor detect pulsating beams from different emitters, wherein the beams pulsate out of phase with each other such that a controller associated with the sensor can determine whether the sensor is responding to one, both, or neither of the two beams.

Another object of some embodiments is to have two pulsating beams converge to a single sensor so that the triangular space between the two beams can be used for defining two spatial limits.

One or more of these and/or other objects are provided by a carwash system according to the claimed subject invention.

BRIEF DESCRIPTION OF THE DRAWINGS

FIG. 3 shows the beam remaking upon reaching the left side of the vehicle.

FIG. 4 shows the arch having rotated to aim its spray nozzles to the right (in relation to the vehicle's left and right side).

DESCRIPTION OF THE PREFERRED EMBODIMENT

Figure 1:
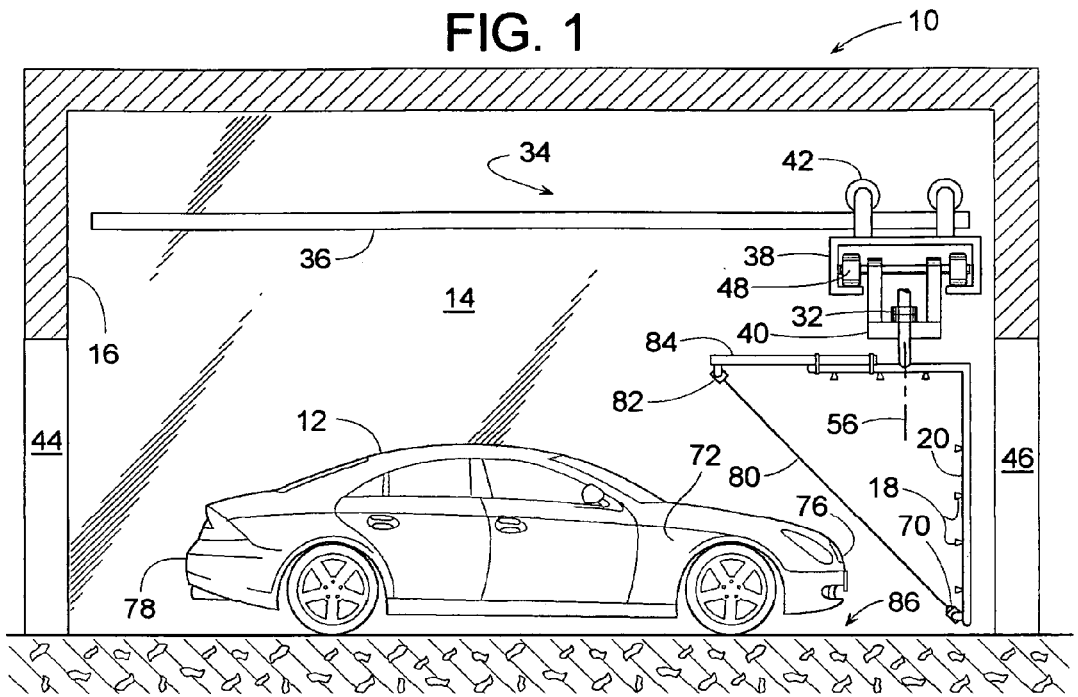
FIG. 1 is a side view of a vehicle parked at desired target position within a wash bay, wherein a spray arch is at a preparatory position prior to washing the vehicle.

FIGS. 1-15 illustrate a carwash 10 and a method of washing a vehicle 12 in a wash bay 14. The term, "carwash" broadly represents any system for spray cleaning not just cars but any vehicle, wherein the term, "vehicle" represents any wheeled transporter. Examples of a vehicle include, but are not limited to, an automobile, truck, van, limousine, bus, mobile home, camper, etc. The term, "wash bay" represents any designated area or volume of space in which a vehicle can be cleaned. Although carwash 10 is shown having walls 16 that define wash bay 14, providing a carwash and wash bay without walls is well within the scope of the invention.

Three aspects of a conventional carwash include a spray arch, a parking display system, and a tire-engaging treadle switch. The parking display system typically provides visual signals that assist drivers in guiding their vehicle to a desired position within the wash bay. Parking display systems, for instance, may tell the driver when to drive forward, when to stop, and when to back up if necessary. The treadle switch, or an appropriate substitute thereof, initiates the wash cycle upon sensing that the vehicle is properly parked within the wash bay. The spray arch, which is a conduit with a series of nozzles, moves around the vehicle to spray wash the vehicle's exterior. An embodiment of the present invention will first be described with reference to its spray arch.

Spray Arch

Carwash 10 includes a series of nozzles 18 on a spray arch 20, which in this particular example happens to be L-shaped for spraying vehicle 12 from both the side and overhead. Spray arch 20 receives pressurized washing fluid 22 (water, soap, chemicals, and various mixtures thereof) from a conventional washing unit 24 (FIG. 13), which are well known to those of ordinary skill in the art. Washing unit 24 may comprise one or more pumps, valves, heaters, tanks, etc. The various components of washing unit 24 may be installed in the same general location, or they may be distributed at various locations throughout carwash 10. In some embodiments, a first conduit 26 conveys washing fluid 22 from unit 24 to an overhead coupling 28. To avoid limiting the movement of spray arch 20, a sufficiently long and flexible or articulated conduit 30 connects overhead coupling 28 to spray arch 20 in some manner, such as via a central port within a rotational coupling 32 that is attached to spray arch 20. It should be appreciated by those of ordinary skill in the art, however, that there may be other ways of supplying spray arch 20 with washing fluid.

To enable spray arch 20 to move at least partially around vehicle 12 within wash bay 14, carwash 10 includes an overhead supporting structure 34, which in this example comprises a track 36 and a carriage 38. The term, "overhead" refers to structure wherein at least part of the structure is at an elevation that is at least five feet high or sufficiently high to pass over the top of a vehicle. Examples of an overhead supporting structure include, but are not limited to, the carriage and track of FIGS. 1-15; elevated carriage with floor, wall, or ceiling mounted tracks; floor mounted gantry, etc.

Figure 29:
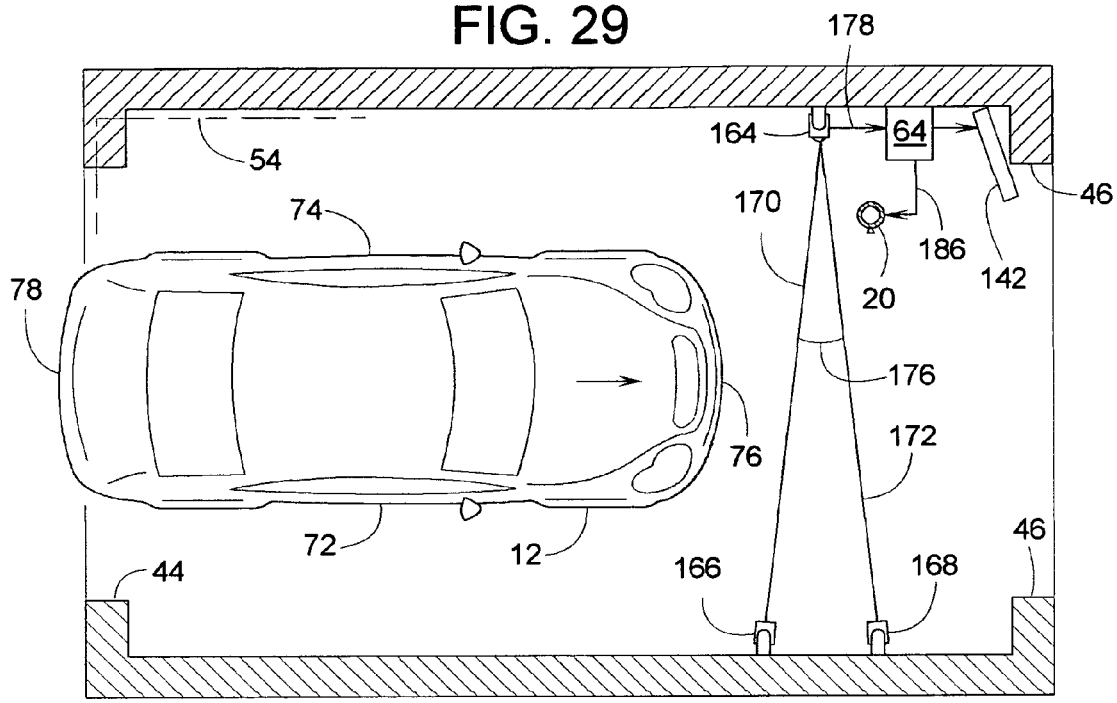
FIG. 29 is a top view of a vehicle approaching a desired target position, which is defined by two beams that converge towards a single sensor.

In the particular example of FIGS. 1-15, carriage 38 supports a trolley 40, which in turn supports spray arch 20. A set of carriage rollers 42 enable carriage 38 to travel lengthwise along track 36, whereby spray arch 20 can move forward and back between, but not necessarily up to, a vehicle entrance 44 and a vehicle exit 46 of wash bay 14. A set of trolley rollers 48 enable trolley 40 to travel along carriage 38 so that trolley 40 can move spray arch 20 sideways between, but not necessarily up to, two lateral limits 50 and 52 (FIG. 14) of wash bay 14. In some cases, entrance 44, exit 46, and lateral limits 50 and 52 define a generally rectangular perimeter, as shown in FIG. 29. Rotational coupling 32 enables spray arch 20 to revolve about an axis 56 that extends vertically (i.e., not perfectly horizontal). Thus, spray arch 20 can translate along the wash bay's length and width and can also rotate about axis 56.

Referring again to FIG. 13, conventional motor drive units 58, 60 and 62 can be coupled to rotational coupling 32 and rollers 48 and 42 to move spray arch 20. A controller 64 can be connected to control the action of the drive units according to an operational sequence that will be described later. Controller 64 is schematically illustrated to represent any device capable of commanding the operation of a motor drive, directly or indirectly. Examples of controller 64 include, but are not limited to, a computer, microprocessor, PLC (programmable logic controller), electromagnetic relays, integrated circuit, analog circuit, digital circuit, and various combinations thereof.

By way of at least one command signal 66 to drive units 58, 60 and 62, controller 64 controls the translation and rotation of spray arch 20 in response to a position feedback signal 68 from a single sensor 70 that helps determine the location of the vehicle's four main surfaces, a right side 72, a left side 74, a front end 76 and a back end 78. In some embodiments, sensor 70 is a photoelectric eye attached to a lower end of spray arch 20. Sensor 70 may be set up to operate in an opposed mode (also known as thru beam), whereby sensor 70 can detect the presence of a beam 80 (infrared, laser, etc.) that is projected by one or more emitters, such as an emitter 82 that an extension piece 84 connects to spray arch 20. Obstructing beam 80 causes sensor 70 to switch from a state of continuity to a state of discontinuity, wherein feedback signal 68 indicates in which state sensor 70 is operating.

Although sensor 70 preferably operates in an opposed mode due to that mode being the most reliable in the normally harsh environment of a carwash, other modes of operation, other types of sensors, and numerous other mounting configurations are conceivable. Sensor 70 and emitter 82, for example, could perhaps be installed side-by-side at the lower end of arch 20 and a reflector could be installed where emitter 82 is shown, whereby sensor 70 would operate in a retroreflective mode. Sensor 70 could possibly be replaced by a photoelectric sensor operating in a diffuse mode where the reflector is omitted, and the sensor responds to reflections directly off the surface of vehicle 12. Also, the locations of sensor 70 and emitter 82 could be interchanged, and in some embodiments relocated entirely.

It should be noted that although beam 80 is shown as a fine line for a more clear understanding of the invention, the actual beam could be more diffuse or spread-out. For a diffuse beam, its centerline of projection will be referred to as its line of sight. Also, in many of the drawing figures, controller 64; drive units 58, 60 and 62; electrical cables; hoses; and other components may be omitted for clarity.

To wash vehicle 12, a wash cycle may follow the sequence illustrated in FIGS. 1-12; however, the actual steps of operation and their order may vary with different embodiments of the invention. In some cases, the number of steps may be more or less than those shown; nonetheless, FIGS. 1-12 provide a good example of how the invention can be carried out.

FIG. 1 shows vehicle 12 parked at a desired target position within wash bay 14. The term, "target position" refers to a desired range of positions or a predetermined zone within which at least a portion of the vehicle is preferably within to facilitate washing vehicle 12. Spray arch 20 is facing front end 76 of vehicle 12 (i.e., nozzles 18 are pointing at front end 76). In describing the subsequent movement of arch 20 within wash bay 14, "forward" means moving generally toward exit 46, "back" means moving generally toward entrance 44, moving "right" and "left" correspond to the right and left side of vehicle 12, and clockwise (CW) and counterclockwise (CCW) are with reference from an overhead view looking down.

Figure 2:
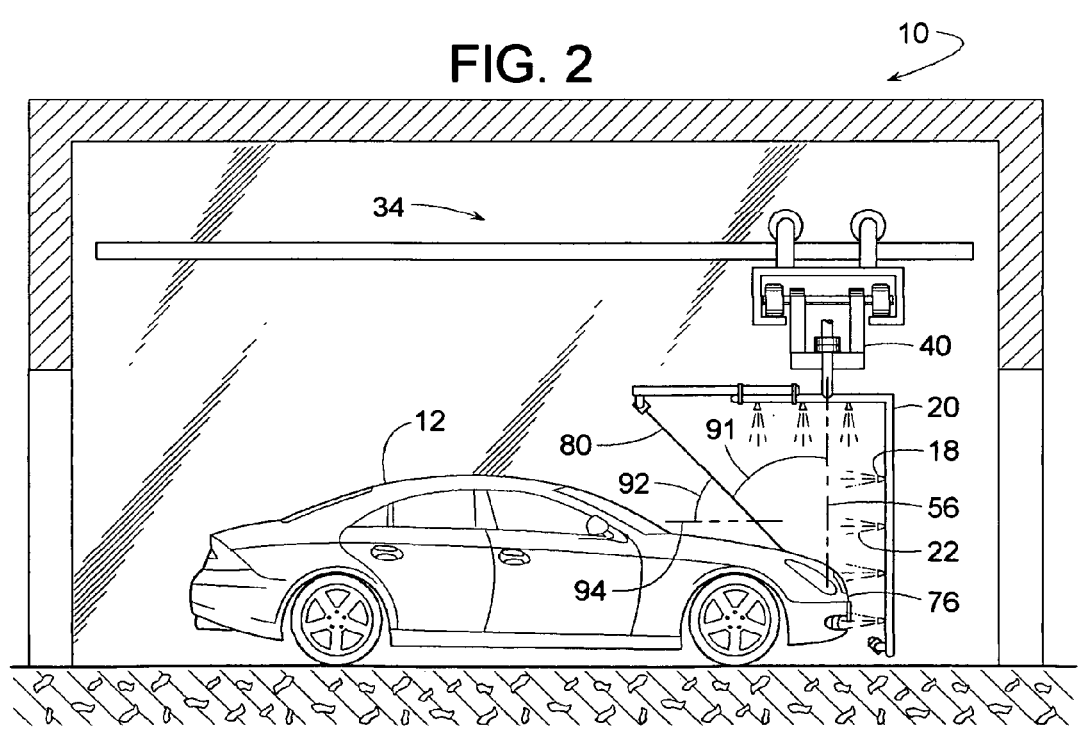
FIG. 2 is similar to FIG. 1, but showing the spray arch having moved toward the vehicle such that the vehicle obstructs a beam, wherein the beam is aimed at a sensor that is coupled to the arch.

In FIG. 2, under command of controller 64, overhead supporting structure 34 and trolley 40 move spray arch 20 towards vehicle 12. After front end 76 of vehicle 12 obstructs or breaks beam 80, spray arch 20 continues moving a short distance (e.g., eight inches or so) toward vehicle 12 to ensure beam 80 is quite obstructed by vehicle 12. In this embodiment, as spray arch 20 moves, beam 80 moves with it, thus beam 80 becomes a moving line of sight. Controller 64, via an output 88 of FIG. 13, commands wash unit 24 to deliver pressurized wash fluid 22 to arch 20, which nozzles 18 spray onto front end 76 of vehicle 12.

At this point in the operation, shown in FIG. 2, the location of front end 76 may not necessarily be accurately known because of the unknown shape and elevation of the vehicle's front end and an acute angle 91 that beam 80 makes with axis 56 or an acute angle 92 that beam 80 makes with an imaginary horizontal plane 94. Angle 92 is preferably between 20 and 80 degrees (or angle 91 is between 70 and 10 degrees) because if beam 80 lies too horizontally, beam 80 may shoot though clear sights of opening through vehicle 12 (e.g., between a tire and a wheel well), and if beam 80 was too upright, then beam 80 may be too close to the vertically extending portion of spray arch 20. Even though the spacing between front end 76 and spray arch 20 may not be accurately known when arch 20 is at the position shown in FIG. 2, spray arch 20, nonetheless, begins moving leftward to the position of FIG. 3.

In FIG. 3, a dashed portion of line 80 indicates beam 80 has become unobstructed for having traveled past left side 74 of vehicle 12. At the moment beam 80 remakes, sensor 70 changes from its state of discontinuity to its state of continuity, which tells controller 64 the location of left side 74. Controller 64 could store the left side location, as well as other subsequently discovered surface locations of vehicle 12 and the rotational position of arch 20, in various ways including, but not limited to, storing a feedback signal from a conventional position indicator such as a resolver or an encoder associated with the appropriate drive unit 58, 60 or 62; storing the time required for arch 20 to reach a particular point; or counting drive impulses sent to drive units 58, 60 and 62.

Referring to FIG. 4, after having determined the location of left side 74, arch 20 rotates approximately 90-degrees CCW to generally face left side 74 and moves to create a desired spraying distance from left side 74. Arch 20 may move to establish, for example, a 14-inch space between nozzles 18 and left side 74. The spacing should be appropriate for the wash fluid to effectively wash vehicle 12. The spacing should be sufficiently large to minimize the risk of arch 20 dragging along the side of the vehicle, yet the spacing should be sufficiently small to ensure that beam 80 remains primarily obstructed for substantially the entire time that arch 20 travels along the full length of vehicle 12.

Figure 5:
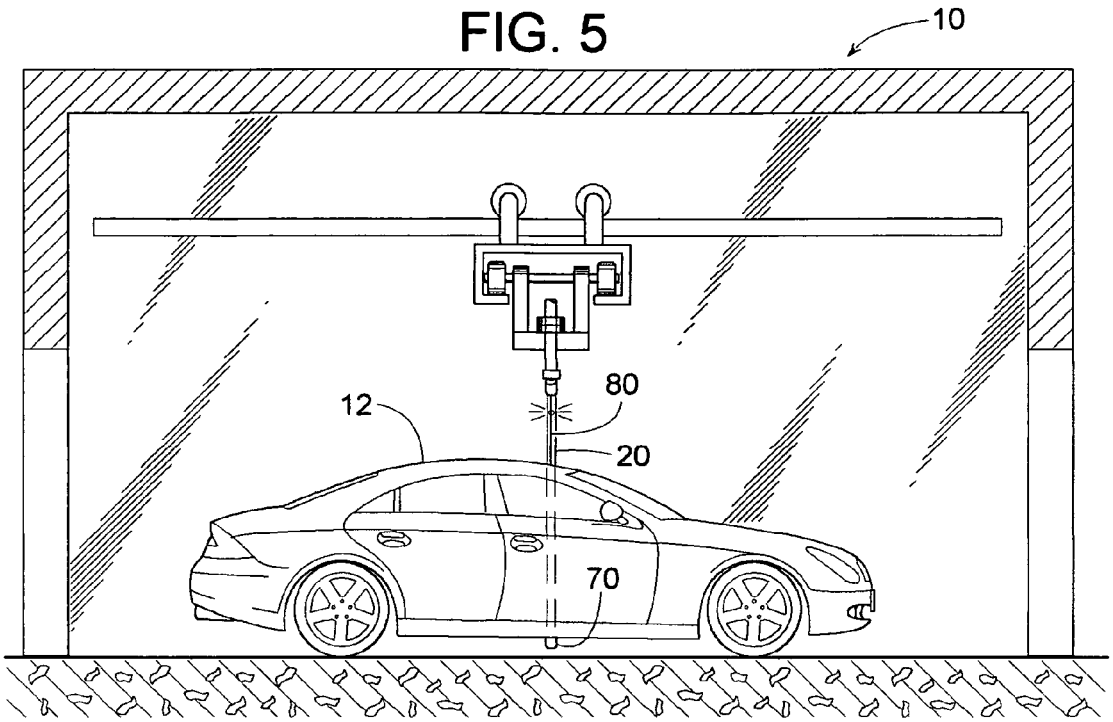
FIG. 5 shows the spray arch washing the vehicle's left side while the vehicle breaks the beam.
Figure 14:
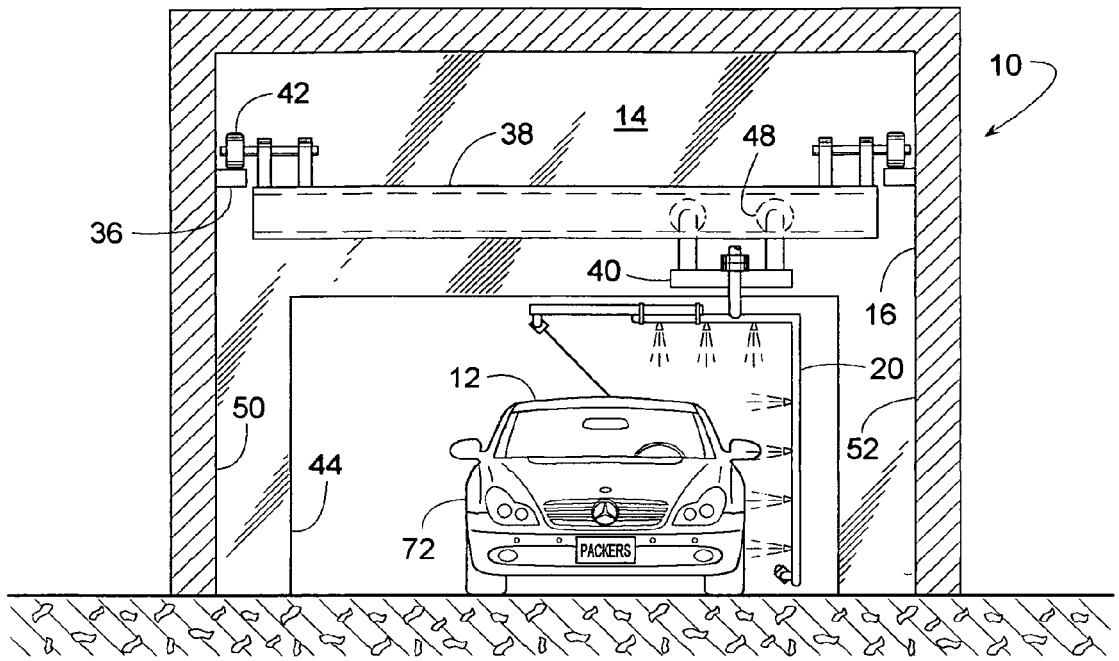
FIG. 14 is a front view of FIG. 5.

Next, in FIG. 5, arch 20 traverses left side 74 from front to back, while beam 80 remains primarily obstructed for substantially the entire time that arch 20 travels along the full length of vehicle 12. The term, "traverses" refers to a spray arch traveling alongside a surface of a vehicle, wherein the spray arch is not necessarily touching the surface (i.e., the arch could be spaced apart from the surface or the arch could be contacting the surface). FIG. 14 shows an end view of FIG. 5.

Figure 6:
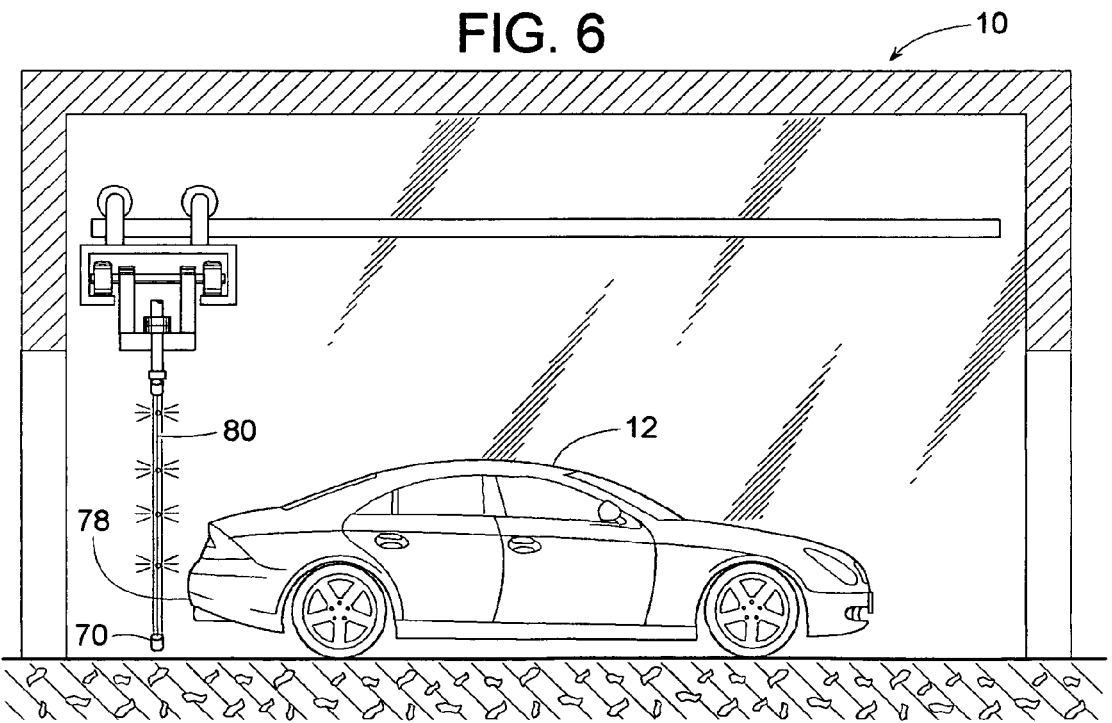
FIG. 6 shows the beam remaking upon reaching the vehicle's back end.
Figure 15:
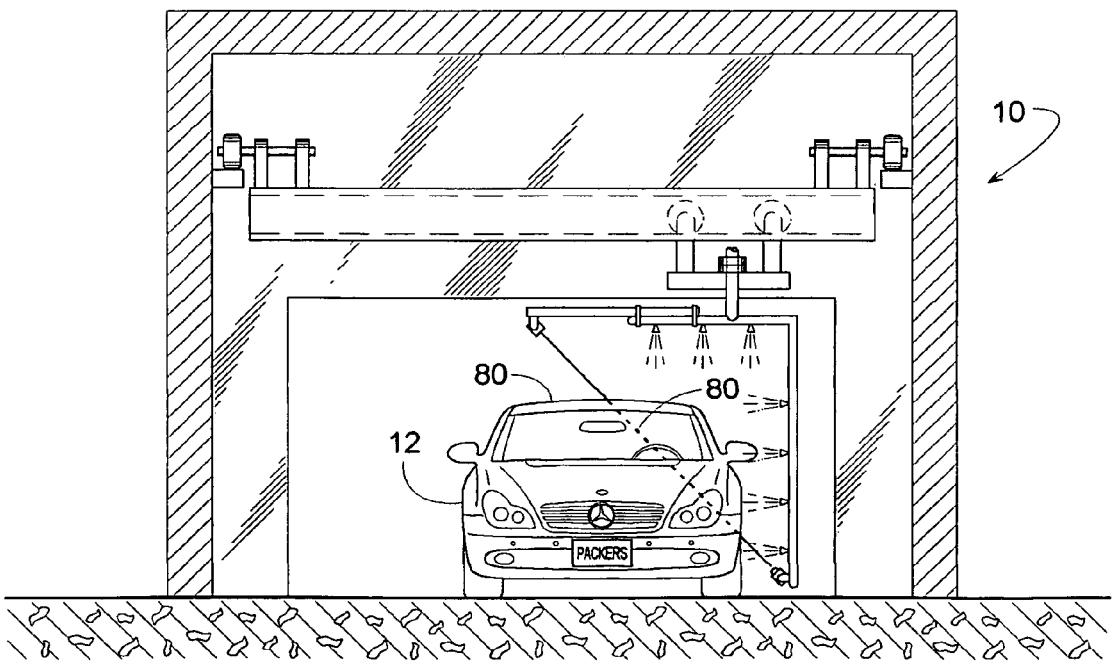
FIG. 15 is a front view of FIG. 6.

FIG. 6 shows beam 80 remaking upon traveling past back end 78 of vehicle 12. At the moment beam 80 remakes, sensor 70 changes from its state of discontinuity to its state of continuity, which tells controller 64 the location of back end 78. With the help of sensor 70, controller 64 now knows the location of left side 74 and back end 78. FIG. 15 shows an end view of FIG. 6, wherein a dashed portion of line 80 signifies that beam 80 is unobstructed behind vehicle 12.

Figure 7:
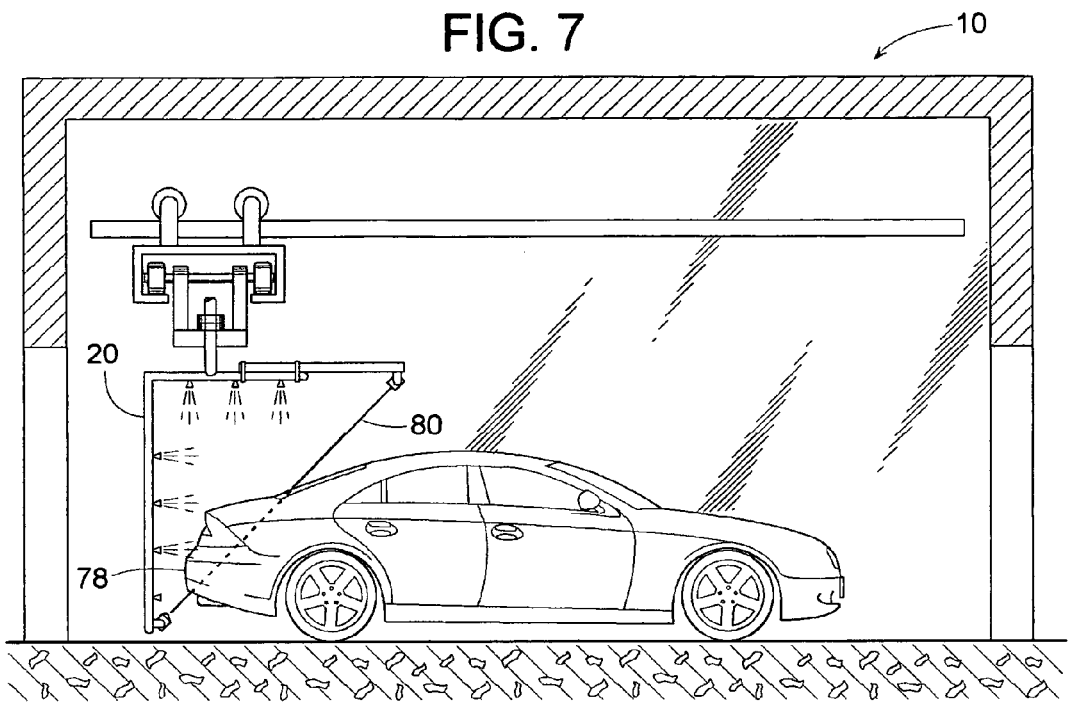
FIG. 7 shows the arch having rotated to aim its spray nozzles forward.

Referring to FIG. 7, after having determined the location of back end 78, arch 20 rotates approximately 90-degrees CCW (180-degrees cumulative) to generally face back end 78 and moves to create a desired spraying distance from back end 78. The arch's movement from FIG. 6 to FIG. 7 is similar to the arch's movement from FIG. 3 to FIG. 4.

Figure 8:
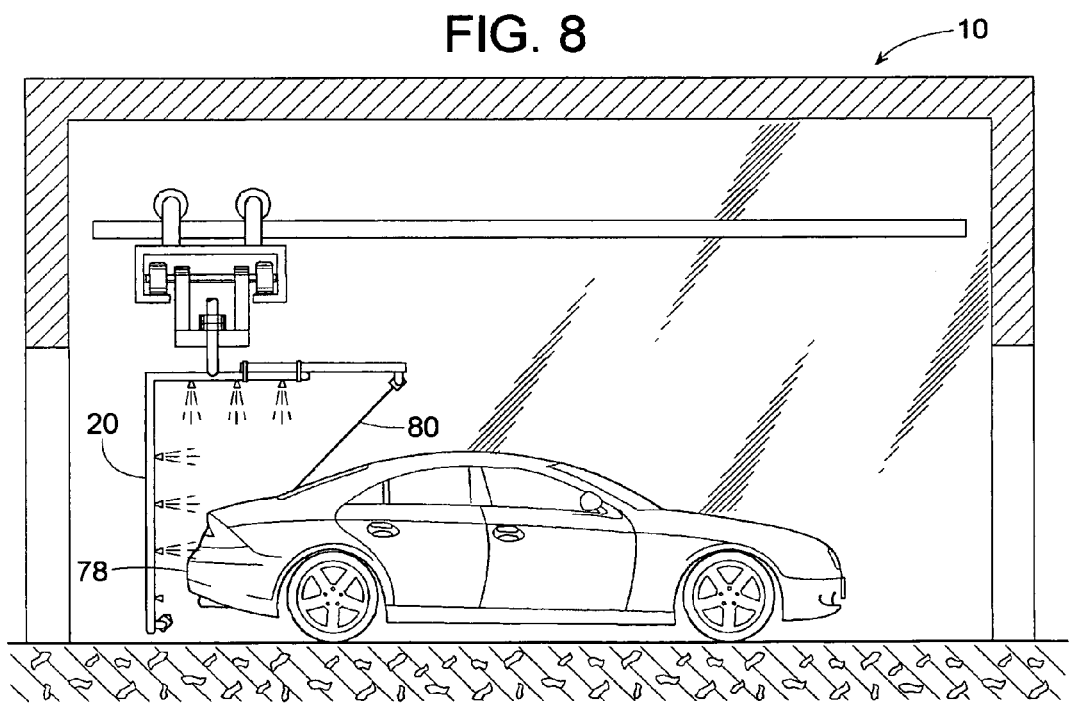
FIG. 8 shows the spray arch traversing the vehicle's back end while the vehicle obstructs the beam.

In FIG. 8, arch 20 traverses back end 78 from left to right in a manner similar to that of traversing left side 74 from front to back. In other words, the operation of FIG. 8 is similar to that of FIG. 5, wherein beam 80 remains primarily broken over the full length or width of the surface being sprayed.

Figure 9:
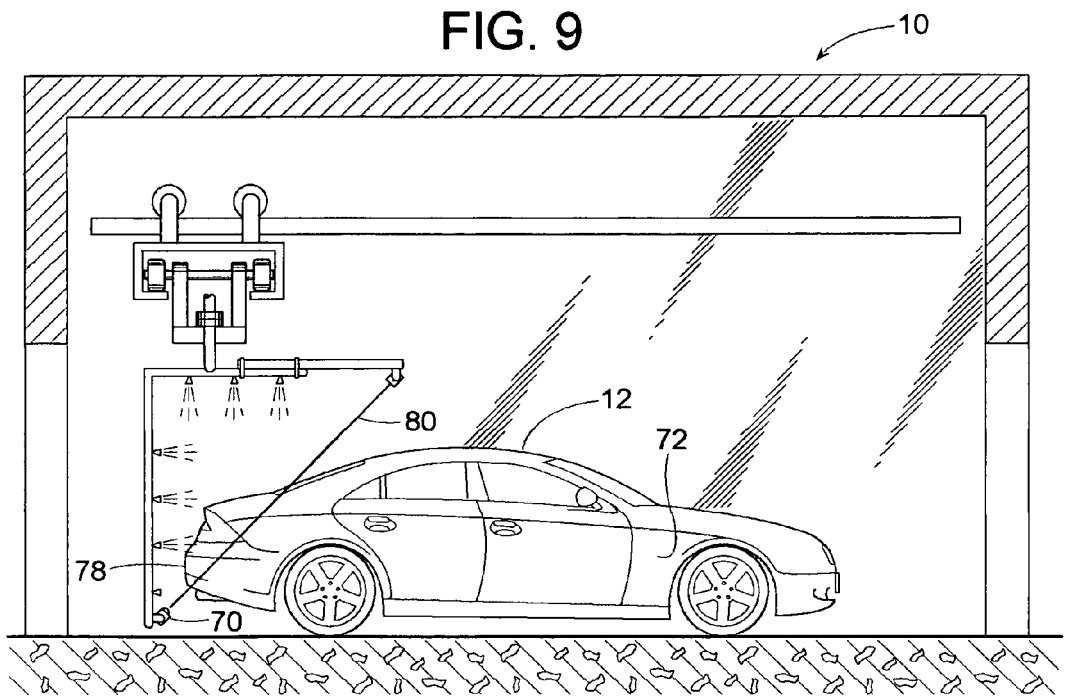
FIG. 9 shows the beam remaking upon reaching the vehicle's right side.

FIG. 9 shows beam 80 remaking upon traveling past right side 72 of vehicle 12. At the moment beam 80 remakes, sensor 70 changes from its state of discontinuity to its state of continuity, which tells controller 64 the location of right side 72. Controller 64 now knows the location of left side 74, back end 78, and right side 72.

Figure 10:
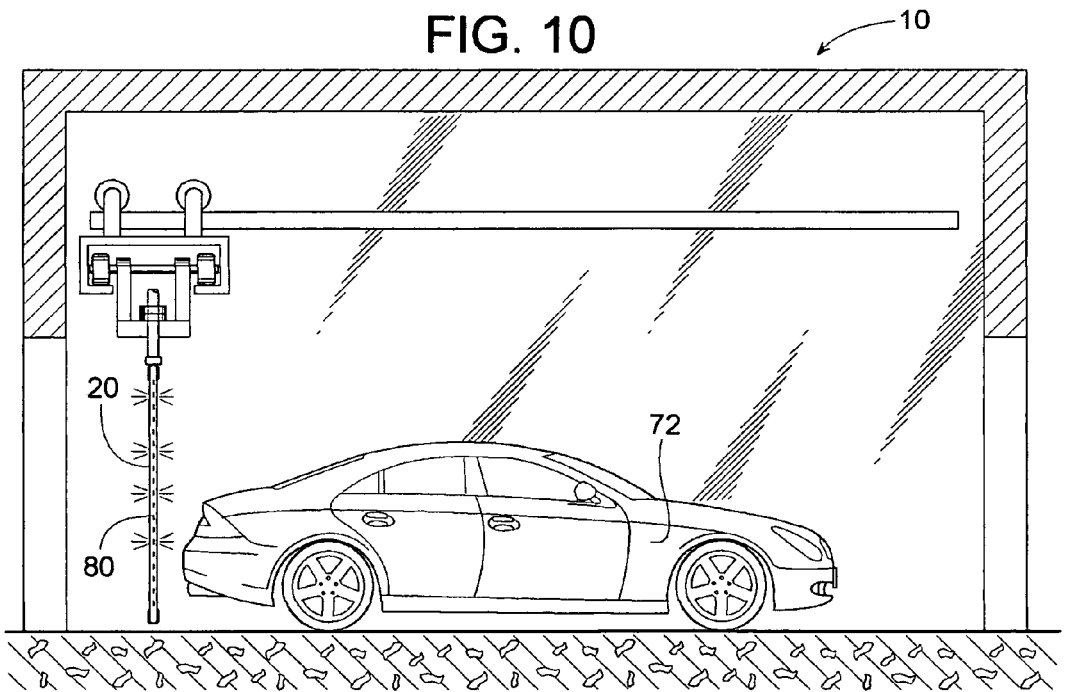
FIG. 10 shows the arch having rotated to aim its spray nozzles to the left.

Referring to FIG. 10, after having determined the location of right side 72, arch 20 rotates approximately 90-degrees CCW (270-degrees cumulative) to generally face right side 72 and moves to create a desired spraying distance between nozzles 18 and right side 72. The arch's movement from FIG. 9 to FIG. 10 is similar to the arch's movement from FIG. 3 to FIG. 4.

Figure 11:
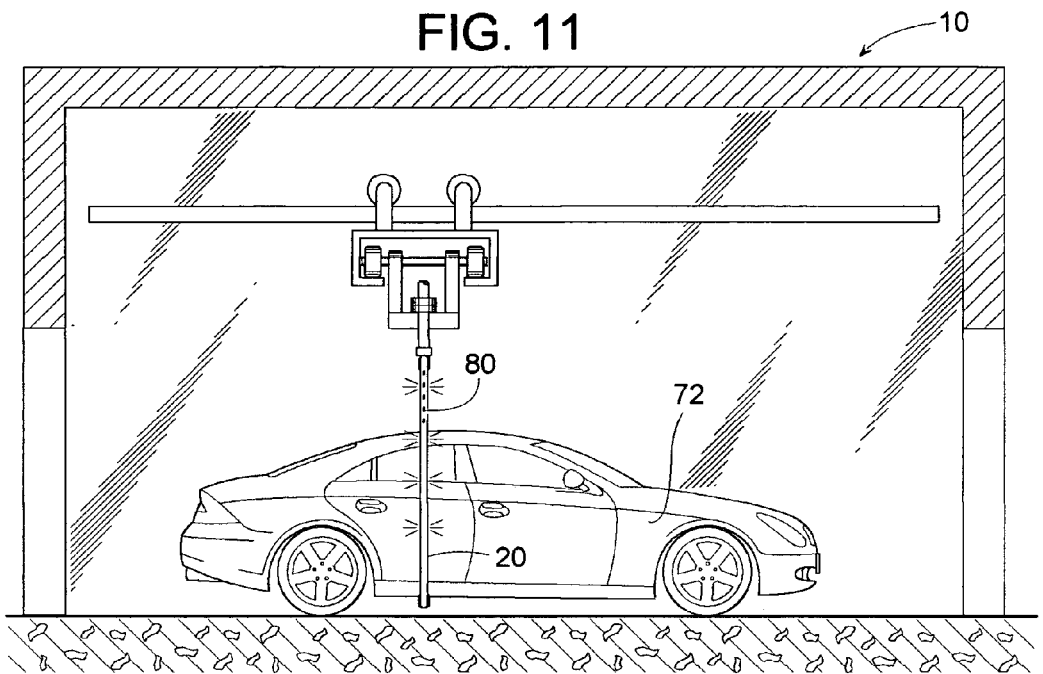
FIG. 11 shows the arch spray washing the vehicle's right side while the vehicle obstructs the beam.

In FIG. 11, arch 20 traverses right side 72 from back to front in a manner similar to that of traversing left side 74 from front to back. In other words, the operation of FIG. 11 is similar to that of FIG. 5, wherein beam 80 remains primarily broken over the full length or width of the surface being sprayed.

Figure 12:
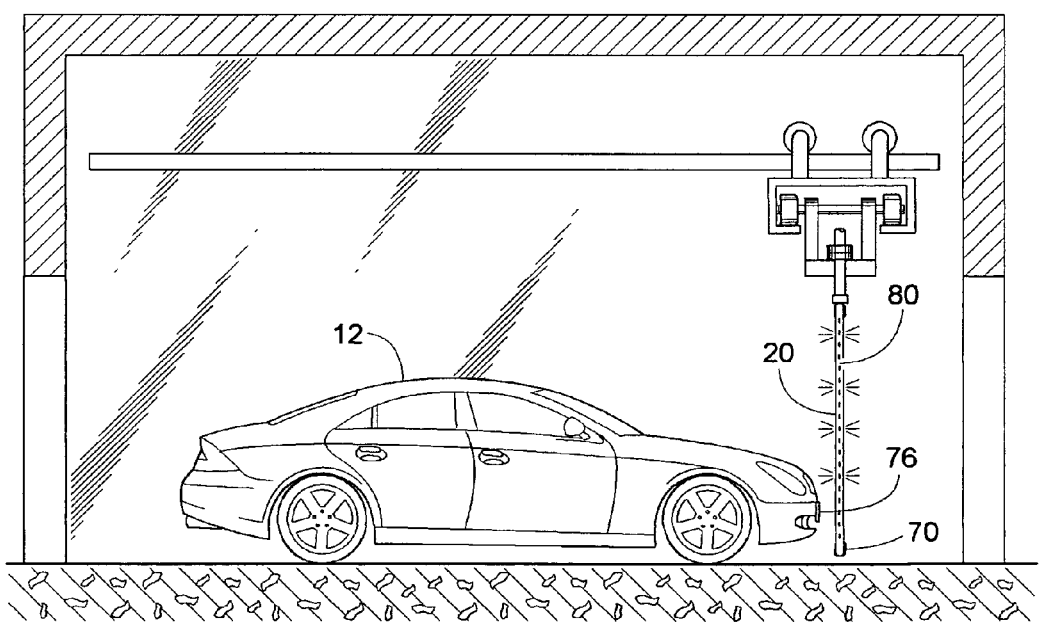
FIG. 12 shows the beam remaking upon reaching the vehicle front end.
Figure 13:
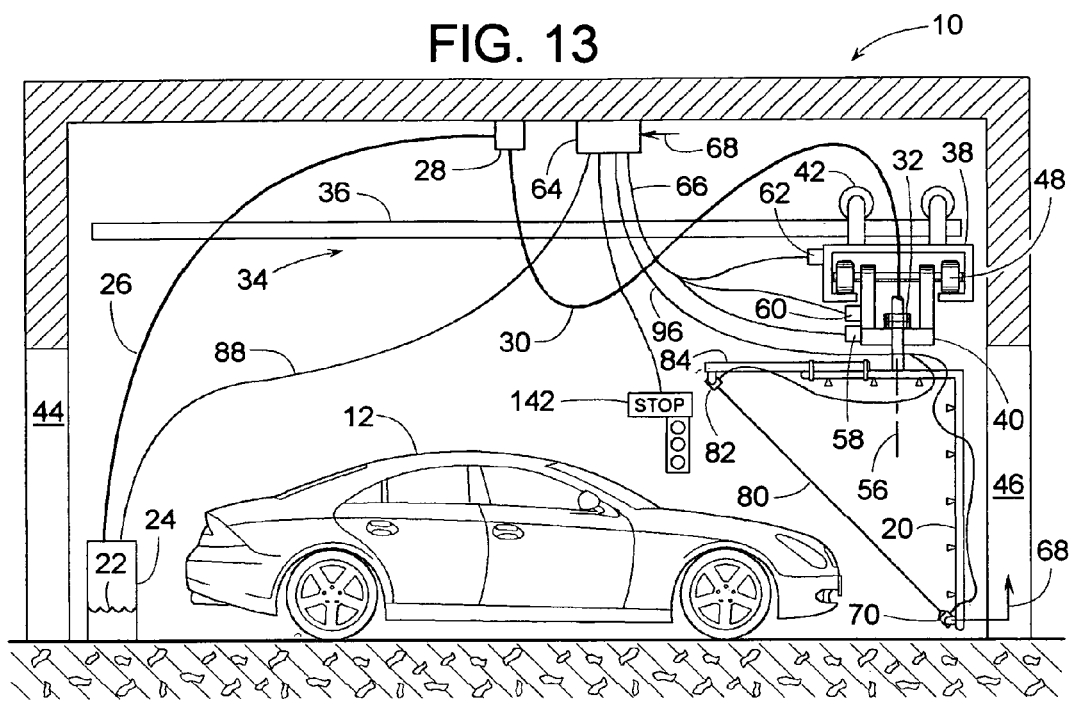
FIG. 13 is similar to FIG. 1 but showing various cables, hoses, motor drive units, and several other items.

FIG. 12 shows beam 80 remaking upon traveling past front end 76 of vehicle 12. At the moment beam 80 remakes, sensor 70 changes from its state of discontinuity to its state of continuity, which provides controller 64 with a more accurate location of front end 76. Once at the right-front corner of vehicle 12, spray arch 20 may rotate another 90-degrees CCW (360-degrees cumulative) and move left to begin spraying front end 76 from a more desirable spacing than what was achieved when arch 20 first traversed front end 76 as shown in FIG. 2.

It should be noted that with the help of just a single sensor (sensor 70), controller 64 determined the location of the vehicle's left side 74, back end 78, right side 72, and front end 76. The determined locations do not necessarily define the vehicle's contour, they may, however, define an envelope or perimeter about which spray arch 20 can safely travel in a generally rectangular path to spray substantially all around vehicle 12 while maintaining an appropriate spraying distance between nozzles 18 and vehicle 12.

Although spray arch 20 has just been described sequentially spray-washing front end 76, left side 74, back end 78, and right side 72, arch 20 does not necessary have to spray those four surfaces in that particular order. Arch 20 can spray the surfaces in any order, it can spray the surfaces individually, or it can spray one or more surfaces simultaneously. Although just a single generally CCW pass around vehicle 12 has just been described, additional passes can be made in a similar manner to perform various desired wash cycles including, but not limited to a presoak, soap application, high pressure wash, soft water rinse, wax, etc.

To prevent such multiple passes from over twisting an electrical cable 96 leading to sensor 70 and/or emitter 82 (FIG. 13), and to prevent the need for a rotatable electrical connector (whose sliding electrical contacts may have trouble withstanding a carwash environment), sequential multiple passes are preferably carried out by alternating between CCW and CW travel patterns. Thus every other pass may follow a sequence similar to the one just described with reference to FIGS. 1-12, but in reverse order, thereby limiting cumulative rotation of the spray arch whose total rotation in any one direction may be limited by cable 96 or some other rotation-limiting component.

If the total wash cycle involves an odd number of passes, spray arch 20 can unwind itself after the last pass by making one last revolution after the first vehicle departs and before the next vehicle enters. Alternatively, if the first of an odd number of passes for washing a first vehicle starts in a CCW direction, the first pass of the next vehicle to be washed can start in a CW direction, whereby the cable that was left twisted after washing the first vehicle can be untwisted during the process of washing the next vehicle.

After the first pass around the vehicle, the intermediate steps of determining the locations of the vehicle's sides and ends may be skipped, or subsequent location-determining steps can be used to verify that the vehicle has not moved from its original location.

Figure 16:
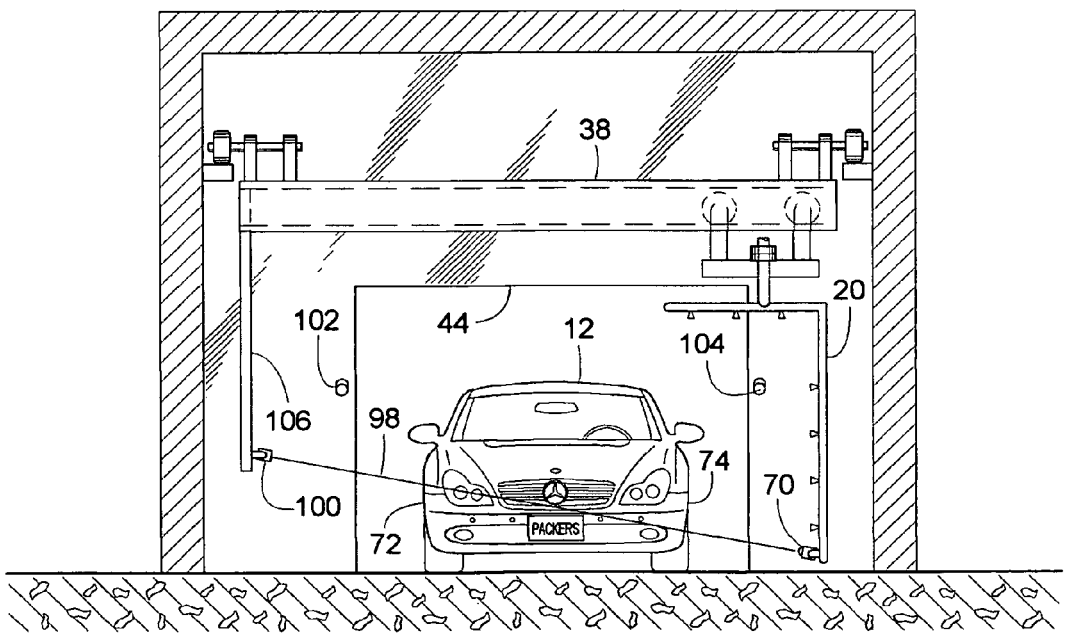
FIG. 16 is a front view similar to FIG. 14 but showing another embodiment and showing the spray arch and beam being in front of the vehicle (similar to the way the arch and beam are in front of the vehicle in FIG. 4).

Although sensor 70 has been shown and described receiving beam 80 from an emitter 82 that is in a fixed relationship with sensor 70 (i.e., sensor 70 and emitter 82 move in unison), in other embodiments of the invention, sensor 70 responds to beams from multiple emitters installed at various locations. In FIG. 16, for example, sensor 70 is still mounted near a lowermost point of spray arch 20; however, sensor 70 is aimed lower to receive a beam 98 from a first emitter 100, a second emitter 102, or a third emitter 104.

In this case, first emitter 100 is attached to an arm 106 extending down from carriage 38. As carriage 38 moves first emitter 100 and sensor 70 from their position of FIG. 16 in front of vehicle 12 to a location behind vehicle 12, controller 64 can determine the position of front end 76 as being the location where vehicle 12 first breaks beam 98, and controller 64 can determine the location of back end 78 as beam 98 remakes just behind vehicle 12.

To determine the location of right side 72 and left side 74, emitters 102 and 104 are installed near the back end of the wash bay along either side of vehicle entrance 44, and their beams point in a generally forward direction. Since the beams of emitters 102 and 104 can spread like the beam of a flashlight, vehicle 12 effectively casts a shadow in front of itself. By rotating arch 20 CW from its position of FIG. 16 so that sensor 70 "looks" back towards emitters 102 and 104, arch 20 can then traverse from left to right in front of vehicle 12 to detect the shadow boundaries created by vehicle 12 being in front of the emitted beams, thereby determining the location of right side 72 and left side 74. More specifically, sensor 70 operates in a state of discontinuity when positioned in the vehicle's shadow directly in front of vehicle 12, and sensor 70 is in a state of continuity when sensor 70 is in clear sight of emitter 102 or emitter 104.

Once sensor 70 determines the location of right side 72, left side 74, front end 76 and back end 78, controller 64 can establish a generally rectangular path that spray arch 20 can follow to wash vehicle 12.

Carwash 10 can also be modified slightly to help spray arch 20 avoid striking unexpected prominent protrusions extending from a vehicle, such as an overextended rearview mirror, trailer hitch, or extra wide fenders. FIGS. 17-20, for example, show a modified carwash 10a whose spray arch 20 supports two additional emitters 108 and 110 that are attached to a cross member 113 extending from an upper portion of arch 20. All three emitters 82, 108 and 110 aim their beams at sensor 70. A central beam 112 accomplishes the same purpose as beam 80 in finding a generally rectangular envelope around vehicle 12; however, beam 112 also works in conjunction with the other two beams 114 and 116 in detecting protrusions.

To detect protrusions, controller 64 commands all three beams to pulsate on and off with the more upright beams 114 and 116 pulsating 180-degrees out of phase with central beam 112. Beam 112 pulsates continuously as spray arch 20 moves around vehicle 12. For beams 114 and 116, controller 64 only operates one of them at a time while the other remains off. The arch's direction of travel determines which of beams 114 or 116 operates at any given time. Controller 64 operates the beam leading the arch's direction of travel, such that beams 112 and 114 operate when arch 20 moves CCW around vehicle 12, and beams 112 and 116 operate when moving CW.

Figure 21:
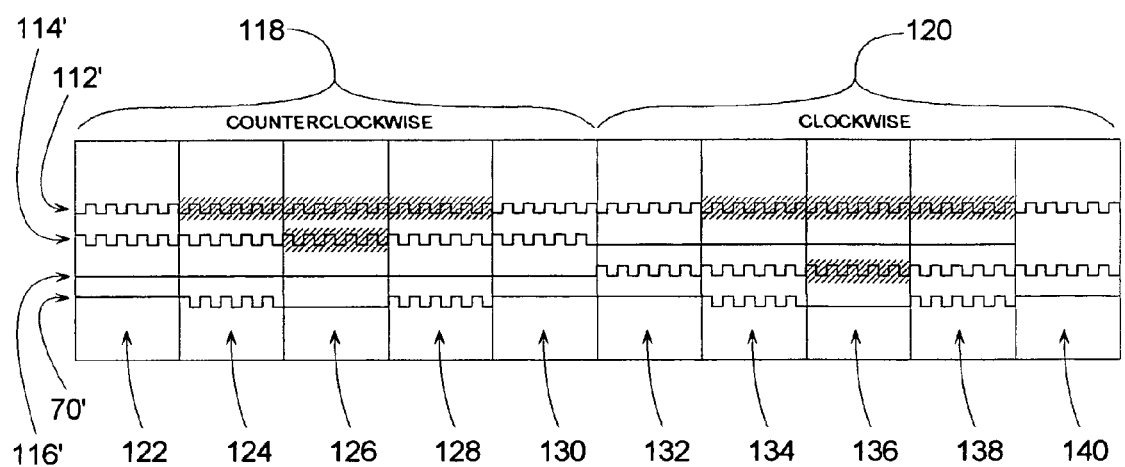
FIG. 21 is a graph showing a single sensor's response in relation to two pulsating beams under various situations.

The ability a single sensor 70 being able to detect a protrusion 12' of vehicle 12 as well as being able to detect the vehicle's front end 76, left side 74, back end 78 and right side 72 can be better understood with reference to FIG. 21. Region 118 shows the state of sensor 70 in response to beams 112, 114 and 116 as arch 20 travels CCW, and region 120 shows the state of sensor 70 in response to beams 112, 114 and 116 as arch 20 travels CW. Plots 112', 114', 116' and 70' represents central beam 112, beam 114, beam 116 of emitter 110, and the response of sensor 70 respectively. The frequency of the pulses can be chosen to suit controller 64 and/or to achieve a desired response time. An appropriate lens (e.g., translucent) and/or reflector may be used to enable sensor to receive beams from different directions. Crosshatched areas represent a pulsating beam being obstructed by vehicle 12.

Column 122 shows sensor 70 detecting both unobstructed beams 112 and 114 whose out of phase pulses complement each other to place sensor 70 in a generally continuous state of continuity. This situation could occur if arch 20 was well in front of or in back of vehicle 12.

Figure 17:
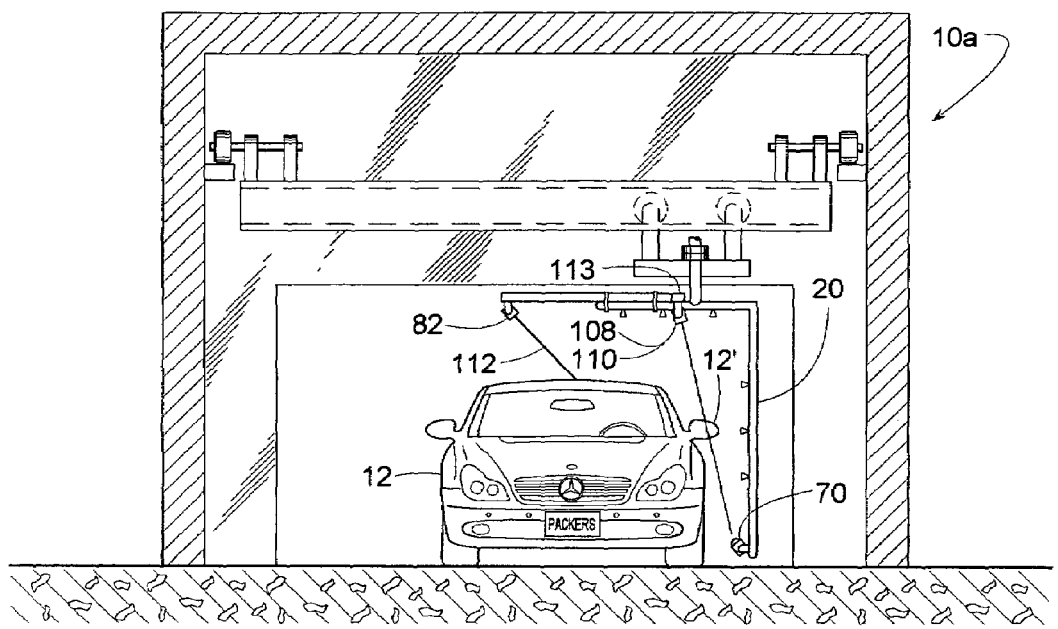
FIG. 17 is a front view similar to FIG. 14 but showing yet another embodiment, wherein the sensor can respond to multiple beams.
Figure 18:
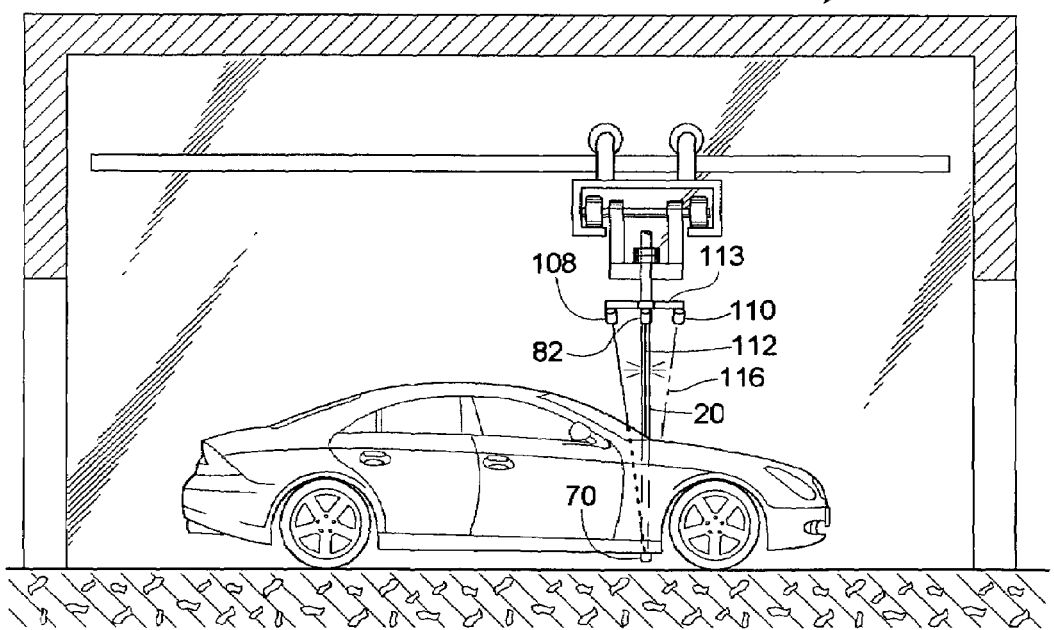
FIG. 18 is a side view of FIG. 18, wherein the vehicle only obstructs one of the beams.

Column 124 could represent FIGS. 17 and 18 with arch 20 moving from front to back. Vehicle 12 obstructs central beam 112, but nothing obstructs beam 114. Thus only pulsating beam 114 reaches sensor 70, which causes sensor 70 to pulsate between the state of continuity and discontinuity. Controller 64 could interpret such a response from sensor 70 as a situation where arch 20 is adjacent to vehicle 12 but has not encountered a protrusion.

Figure 19:
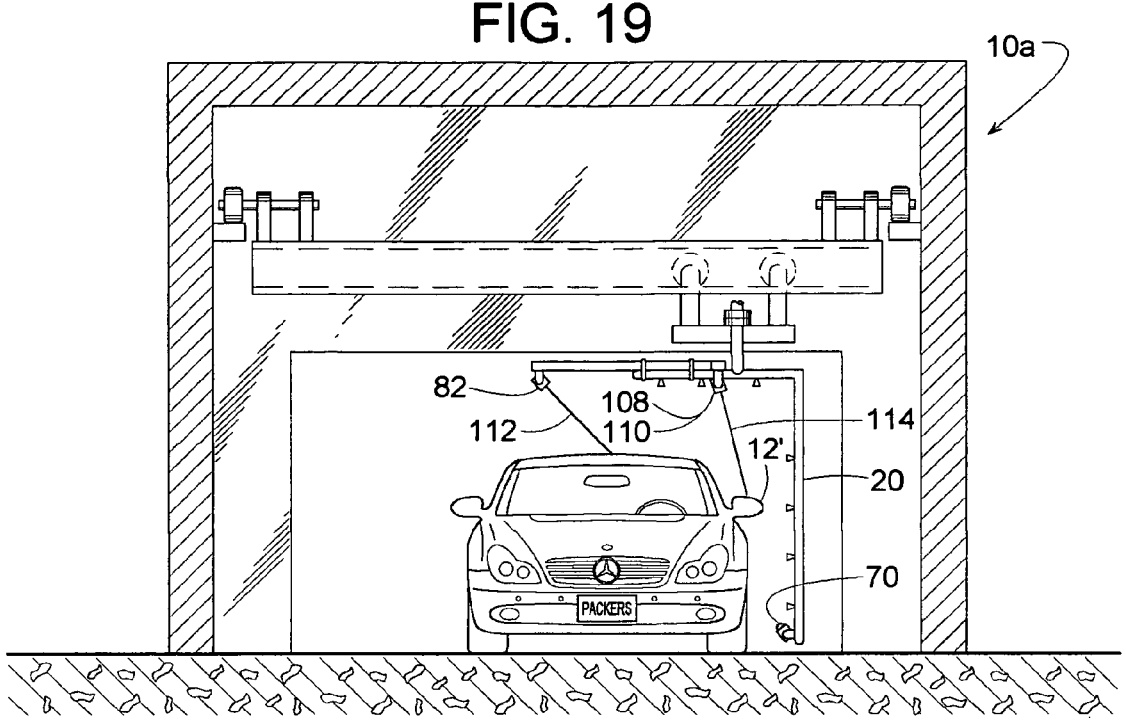
FIG. 19 is a front view similar to FIG. 17 but showing a side mirror obstructing the second beam, whereby the vehicle now obstructs both beams.
Figure 20:
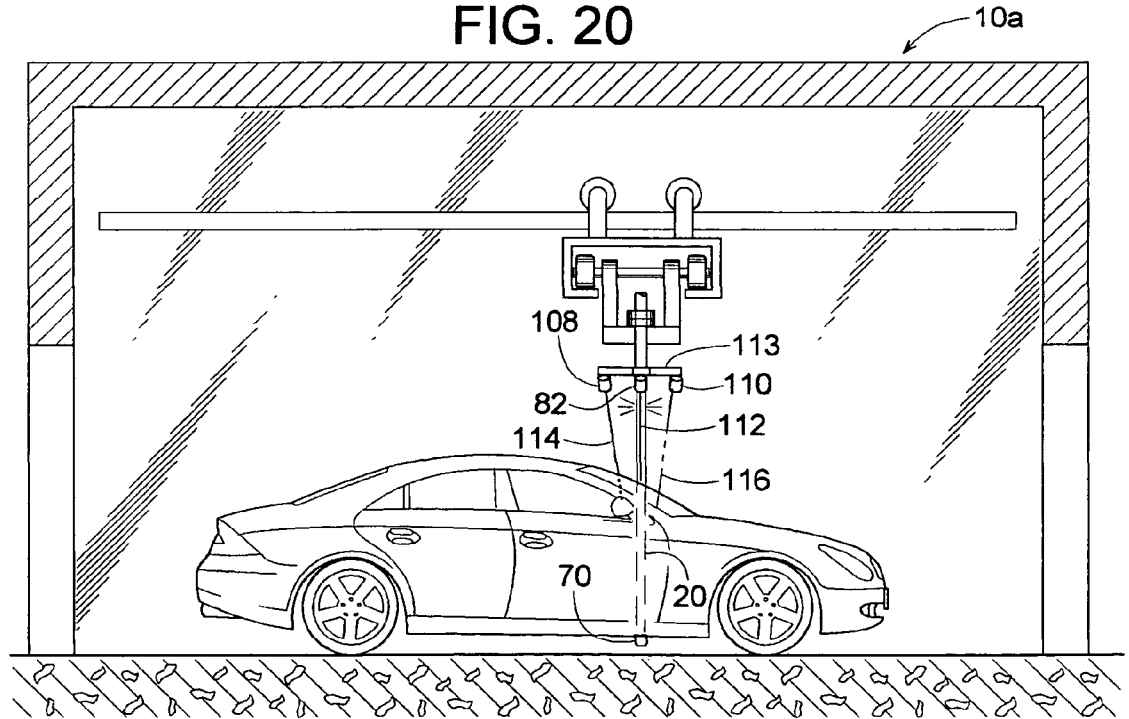
FIG. 20 is a side view of FIG. 19, wherein the arch has moved to a position where the vehicle can obstruct both beams.

Column 126 could represent FIGS. 19 and 20 with arch 20 moving from front to back. Vehicle 12 obstructs central beam 112, and protrusion 12' obstructs beam 114. Since both beams are obstructed, sensor 70 remains generally in a state of discontinuity. Controller 64 could respond to the obstruction by redefining the safe rectangular envelope around vehicle 12, or controller 64 could redirect arch 20 around protrusion 12'.

Column 128 is the same as column 124 and could represent beam 114 remaking after arch 20 travels past protrusion 12'.

Column 130 represents sensor 70 detecting both unobstructed beams 112 and 114, which would be expected when arch 20 travels past the vehicle's back end 78. Controller 64 could define the location of back end 78 as being the point when sensor 70 changes from pulsating between continuity and discontinuity in column 128 to a state of continuous continuity in column 130.

Column 132, 134, 136, 138 and 140 are similar to columns 122, 124, 126, 128 and 130 respectively but with arch 20 moving CW instead of CCW. In the CW direction, the beam of sensor 116 is activated in a pulsating manner, while beam 114 remains off.

Although the spray arch system just described could be used alone or in conjunction with various parking display systems, a preferred embodiment of a parking display system is as follows:

Parking Display System

Figure 23:
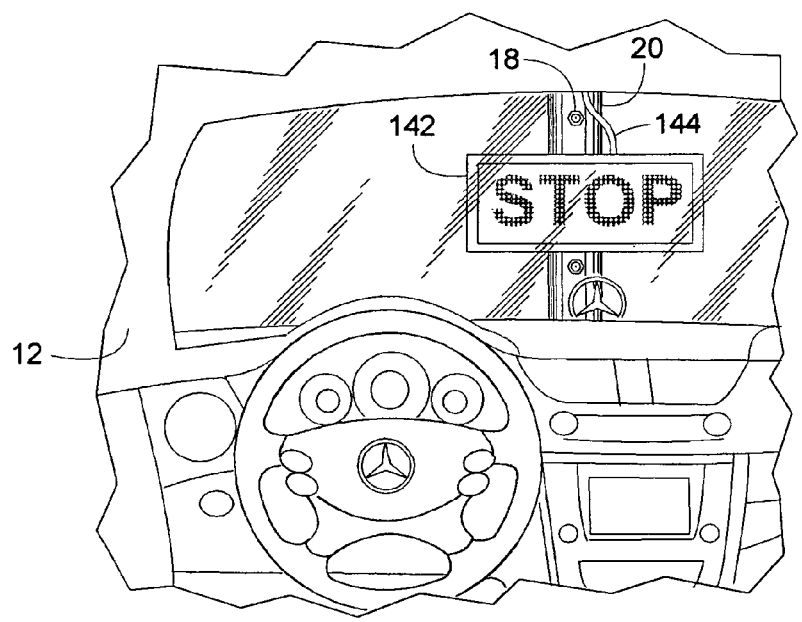
FIG. 23 shows a driver's view of a spray arch and a parking display system generally aligned with the vehicle's hood ornament when the vehicle is at a target position within the wash bay.
Figure 22:
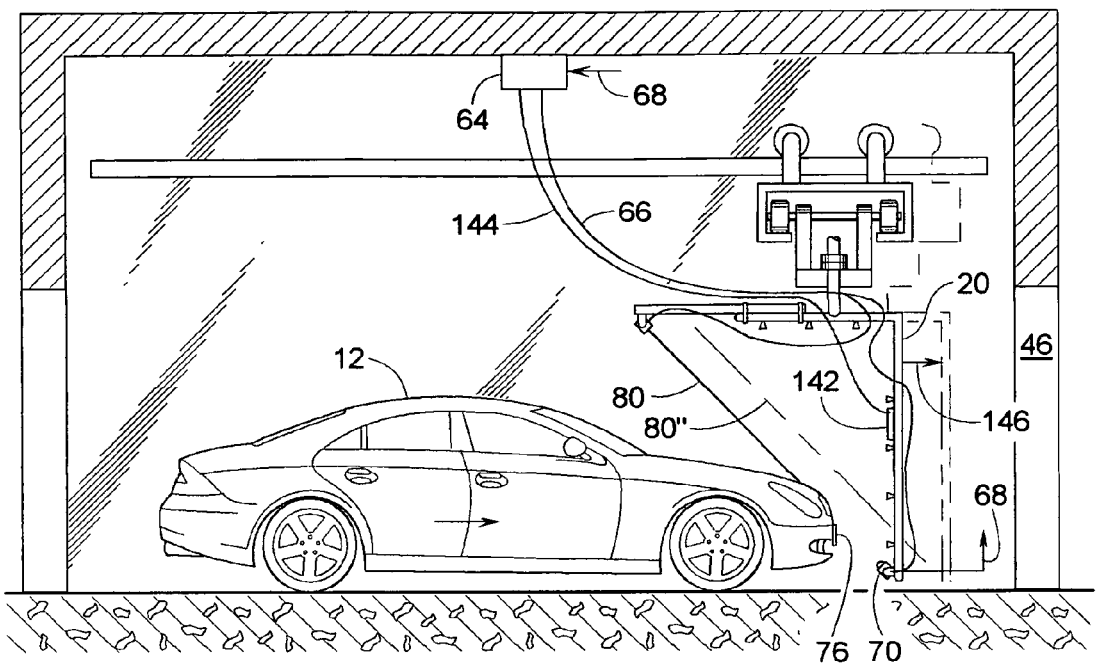
FIG. 22 is a side view similar to FIG. 1 but showing another embodiment.

A parking display system 142, shown in FIGS. 22 and 23, can be installed directly on spray arch 20. If arch 20 is centrally located between two lateral limits 50 and 52 and squarely in front of vehicle 12 as the vehicle enters the wash bay, display 142 can provide not only a centrally located target that helps the driver in guiding the vehicle left and right, but display 142 can also selectively display messages that tell the driver when to come forward, stop, or go back. With arch 20 in such a preparatory position between the vehicle's target position and exit 46, display 142 may provide a "come forward" signal as vehicle 12 enters the wash bay. Once vehicle 12 reaches its target position, as shown in FIG. 22, display 142 may switch to a "stop" signal.

Although individual messages may be referred to as a "drive-forward signal," a "stop signal," or a "back-up signal," those messages are labeled as such only to convey their general meaning. The "drive-forward signal," for instance, really represents anything that would indicate that the driver should move the vehicle forward. Examples of a drive-forward signal include, but are not limited to, a text message saying "drive forward," "come forward," "enter," "proceed," "go," etc.; a green light; an arrow; etc.

Display system 142 is schematically illustrated to represent any device that can selectively display a plurality of display signals or messages that assist the driver in guiding vehicle 12. The messages can be selectively displayed at a single location, such as on a display monitor (e.g., matrix of LEDs), or the messages can be individual signs that are selectively illuminated. Either way, at least one electrical cable 144 may need to run from a stationary power supply and or from controller 64 to power and control display 142, which is attached to the moving spray arch 20. Since cable 144 may limit the cumulative rotation of arch 20, display system 142 may benefit from the idea of alternating the rotation of arch 20 between CW and CCW rotation as described earlier.

Controller 64 controls display 142 in response to a parking position signal, such as, for example, signal 68 from sensor 70. In perhaps its simplest application, controller 64 commands display 142 to provide a stop signal in response to vehicle 12 obstructing beam 80. The system, however, can be set up to do a lot more than that.

In some application, controller 64 positions arch 20 at its preparatory position of FIG. 22 with display 142 facing directly toward front end 76 of vehicle 12. As vehicle 12 enters the wash bay and approaches the target position, display 142 provides a drive-forward signal. When vehicle 12 obstructs beam 80, controller 64 responds by directing display 142 to provide a stop signal and commands spray arch 20 to move forward (i.e., towards exit 46 as indicated by arrow 146) a predetermined short distance such as, for example, ten inches. This moves beam 80 to the position indicated by phantom line 80", whereby beam 80 remakes, provided vehicle 12 has in fact stopped within its target position of FIG. 22. If at this position, sensor 70 remains in its state of continuity for a predetermined period (e.g., five seconds or so), then controller 64 assumes that vehicle 12 is properly parked, and controller 64 initiates a wash cycle such as, for example, the one described earlier with reference to FIGS. 1-15.

If, however, vehicle 12 continues to drive forward past the target position and obstructs beam 80 at its new position depicted by phantom line 80", then controller 64 directs display 142 to provide a back-up signal and commands arch 20 to get out of the way to avoid being struck by vehicle 12. Eventually, controller 64 may command arch 20 to cautiously move back towards its original preparatory position to "feel around" or detect whether vehicle 12 is properly parked.

Figure 25:
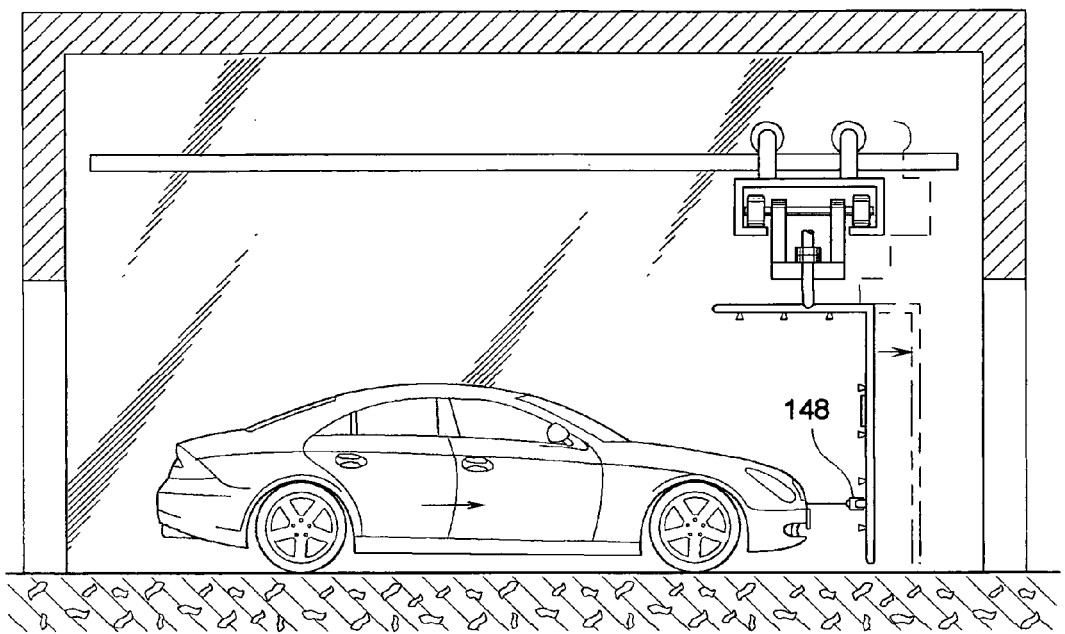
FIG. 25 is a side view similar to FIG. 22 but showing another embodiment.
Figure 26:
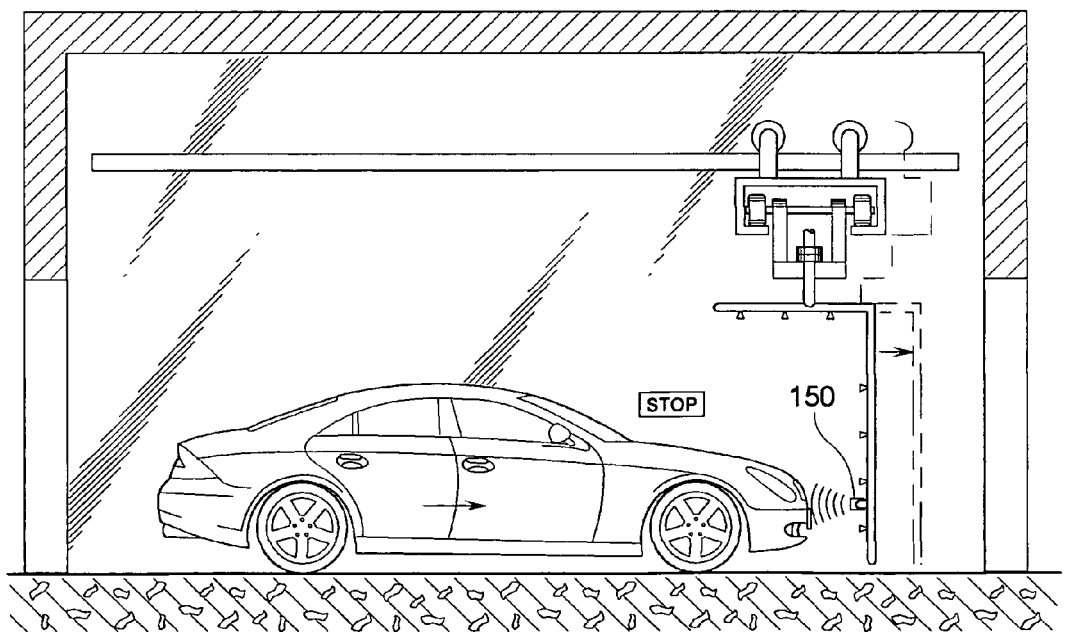
FIG. 26 is a side view similar to FIGS. 22 and 25 but showing yet another embodiment.

This same general principle mode of operation could conceivably be achieved by replacing sensor 70 with a sensor 148 operating in a diffuse mode, as shown in FIG. 25, or by replacing sensor 70 with an ultrasonic sensor 150, as shown in FIG. 26.

Figure 24:
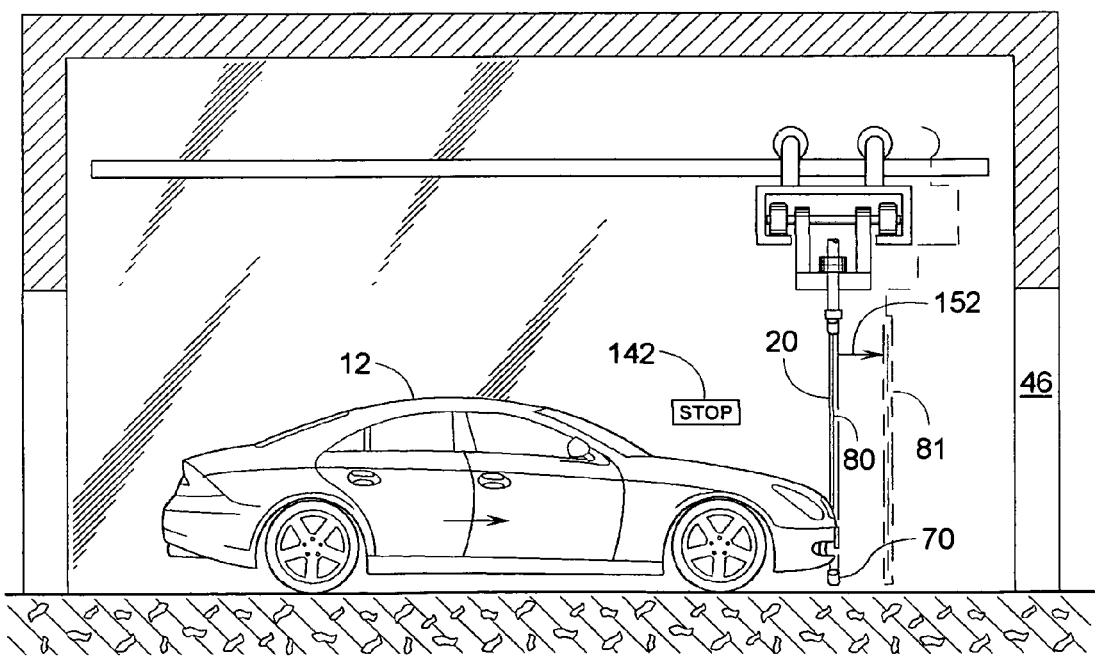
FIG. 24 is a side view similar to FIG. 4 but showing another embodiment and showing the spray arch in a preparatory position where the arch starts out facing sideways.

In another embodiment of a parking display system, the preparatory position of spray arch 20 is as shown in FIG. 24 as compared to the preparatory position of FIG. 22. It should be noted that FIG. 24 is similar to FIG. 4. With arch 20 starting in the preparatory position FIG. 24, arch 20 is generally between vehicle 12 and one of the two lateral limit (e.g., limit 52) of the wash bay, or if vehicle 12 is not yet at the target position, arch 20 starts out between the target position and one of the two lateral limits. Parking display system 142, in this case, can be floor-mounted or wall-mounted at a generally fixed location.

With the embodiment of FIG. 24, as vehicle 12 enters the wash bay and approaches the target position, display 142 provides a drive-forward signal. As soon as vehicle 12 obstructs beam 80, controller 64 responds by directing display 142 to provide a stop signal and commands spray arch 20 to move forward (i.e., towards exit 46 as indicated by arrow 152) a predetermined short distance such as, for example, ten inches. This moves beam 80 to the position indicated by phantom line 81, whereby beam 80 remakes, provided vehicle 12 has in fact stopped within its target position. If at the new position indicated by phantom lines, sensor 70 remains in its state of continuity for a predetermined period (e.g., five seconds or so), then controller 64 assumes that vehicle 12 is properly parked, and controller 64 initiates a wash cycle such as, for example, the one described earlier with reference to FIGS. 1-15.

If, however, vehicle 12 continues to drive forward past the target position and obstructs beam 80 at its new position depicted by phantom line 81, then controller 64 directs display 142 to provide a back-up signal. Eventually, controller 64 may command arch 20 to move back towards its original preparatory position to determine whether vehicle 12 is properly parked.

Figure 27:
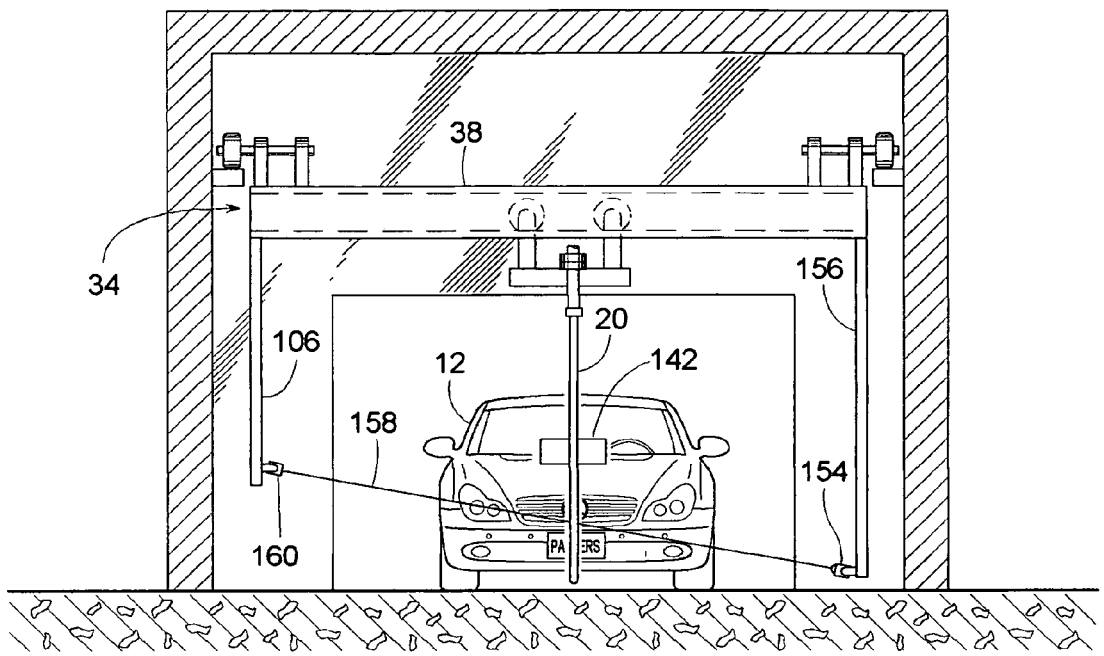
FIG. 27 is a front view showing a spray arch in a preparatory position of still yet another embodiment.

In yet another embodiment, shown in FIG. 27, parking display system 142 is attached to spray arch 20 in a manner similar to that of FIGS. 22 and 23, and controller 64 controls display 142 in response to feedback from a sensor 154 that is now mounted to an arm 156 extending down from carriage 38. Sensor 154 responds to a beam 158 projected from an emitter 160, which is attached to arm 106 in a setup similar to that of FIG. 16. In response to feedback from sensor 154, controller 64 directs the operation of display 142 and commands the forward/back movement of carriage 38 just as controller 64 directed the operation of display 142 and the forward/back movement of carriage 38 in FIG. 24.

In the preparatory position shown in FIG. 27, sensor 154 detects the presence of the vehicle's approaching front end 76 in a manner similar to the way sensor 70 operates in FIG. 24. Upon vehicle 12 reaching the target position and thus obstructing beam 158, controller 64 moves overhead supporting structure 34, arms 106 and 156, sensor 154, and emitter 160 a few inches forward just as overhead supporting structure 34 moves arch 20 and sensor 154 forward in FIG. 24. After beam 158 remakes at its new, more forward position, and sensor 154 remains in its state of continuity for a predetermined period, controller 64 may initiate a wash cycle that operates in some appropriate manner.

Figure 28:
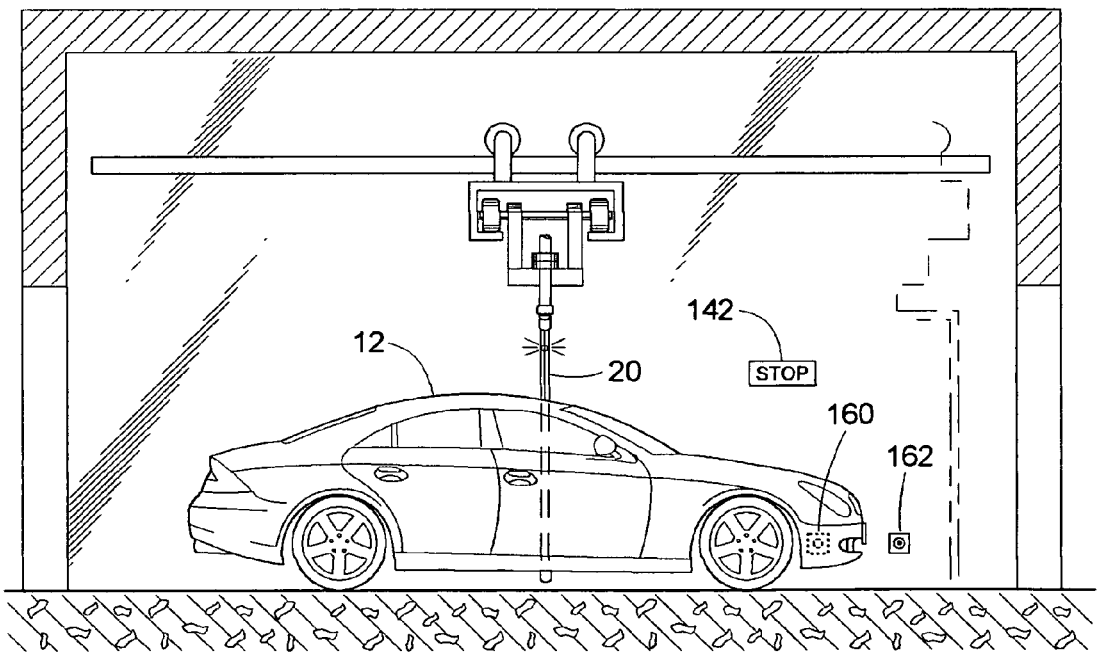
FIG. 28 is a side view showing how a spray arch can travel across one or more beams that are aimed at a sensor.

In still yet another embodiment, shown in FIG. 28, controller 64 controls parking display system 142 in response to feedback from a first sensor 160 and a second sensor 162. Sensors 160 and 162 each respond to a beam from two corresponding emitters, wherein the emitters project beams laterally across the width of the wash bay. When both sensors 160 and 162 detect their respective beams, controller 64 directs display 142 to provide a drive-forward signal. When vehicle 12 obstructs only the first beam aimed at sensor 160, display 142 provides a stop signal, which indicates that vehicle 12 is properly parked within a predetermined target position. And when vehicle 12 obstructs both beams, display 142 provides a back-up signal.

Once vehicle 12 is parked at the target position, controller 64 can initiate a wash cycle; however, controller 64 may continue monitoring sensors 160 and 162 to ensure that vehicle 12 remains at the target position. Should vehicle 12 unexpectedly move from the target position during the wash cycle, controller 64 can temporarily interrupt the wash cycle or abort it entirely. Being able to continue monitoring sensors 160 and 162 for the purpose of determining whether vehicle 12 moves significantly during the wash cycle means that controller 64 may need to be set up to periodically disregard sensor 160 and/or 162 when arch 20 crosses one or both of the beams aimed at sensors 160 and 162. Two positions of arch 20 represented by solid lines and phantom lines suggest that arch 20 can actually pass across the two beams aimed at sensors 160 and 162. Informing controller 64 of when arch 20 passes in front of one or both of the beams can be readily accomplished by providing controller 64 with a position feedback signal that indicates the position of arch 20, or controller 64 may already know the position of arch 20 because it is controller 64 itself that directs the movements of arch 20.

Although some methods of vehicle sensing have been mentioned during the descriptions of the spray arch and the parking display system, the following section will describe multiple embodiments of a treadle alternative for detecting when a vehicle is properly parked at a predetermined target position within a wash bay.

Treadle Alternative

FIGS. 29-33 illustrate how a single sensor 164 can be used as a treadle alternative for actuating, initiating, controlling or otherwise affecting the operation of a wash mechanism. The term, "wash mechanism" refers to any apparatus used for cleaning a vehicle. Examples of a wash mechanism include, but are not limited to, spray arch 20, washing unit 64, etc.

Figure 30:
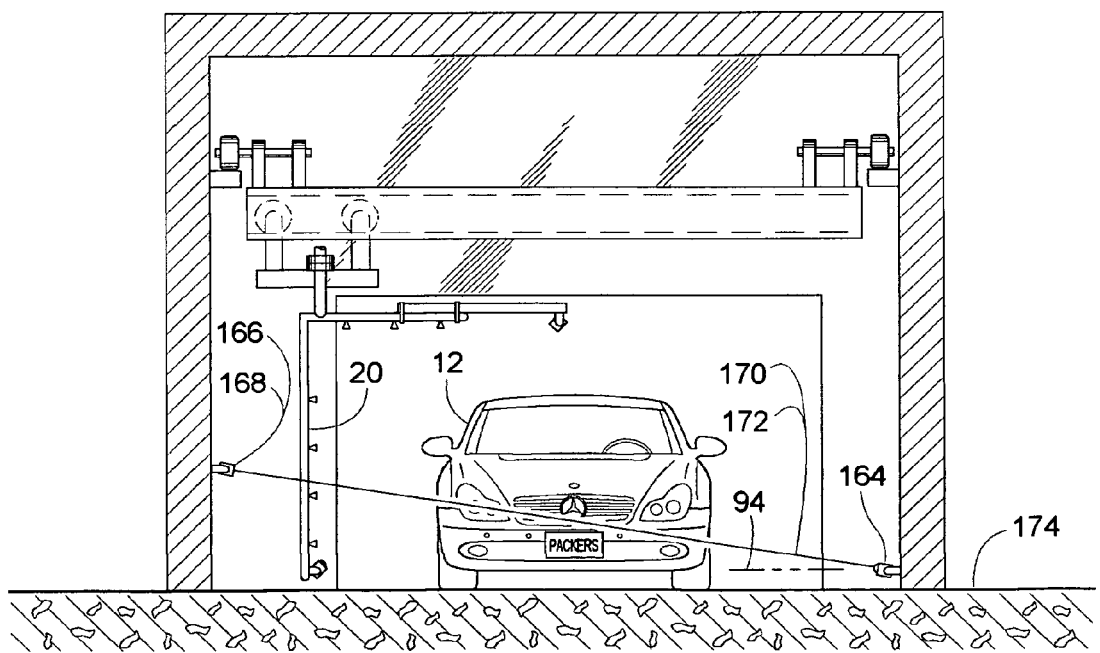
FIG. 30 is a front view of FIG. 29.

In some embodiments of the treadle alternative, two emitters 166 and 168 each project a beam 170 and 172 across a span that extends for most of the bay width of the wash bay, wherein both beams are aimed generally at sensor 164. The bay width is generally defined as the distance between two side walls or two lateral limits of the wash bay. In some embodiments, sensor 164 and emitters 166 and 168 are substantially stationary, wherein emitter 168 is closer to exit 46 than is emitter 166. Referring to FIG. 30, the beams preferably lie at an incline relative to a floor 174 of the wash bay or an imaginary horizontal plane 94. Beams 170 and 172 (i.e., their centerline or line of sight) converge to define an acute angle 176 therebetween. Angle 176 creates a spacing between beams 170 and 172 that defines the forward and back limits of the target position at which vehicle 12 is preferably parked during the wash cycle.

To determine whether front end 76 of vehicle 12 is between beams 170 and 172, controller 64 commands emitters 166 and 168 to pulsate on and off, 180-degrees out of phase to each other, in a manner similar to that of emitters 82 and 108 of FIGS. 17-21. The result is best understood with reference to FIG. 33, which shows three plots. Plot 170' represents beam 170, plot 172' represents beam 172, and plot 164' represents the resulting state of sensor 164 as indicated by a parking position signal 178 from sensor 164. The crosshatched areas represent a pulsating beam being obstructed by vehicle 12.

Column 180 shows sensor 164 detecting both unobstructed beams 170 and 172 whose out of phase pulses complement each other to place sensor 164 in a continuous state of continuity. This situation would be expected to exist when vehicle 12 first enters the wash bay and before vehicle 12 reaches the target parking position, as shown in FIG. 29. Thus, controller 64 might direct a parking display system 142 to provide a drive-forward signal.

Column 182 indicates that vehicle 12 is only obstructing beam 170, so sensor 164 pulsates between its states of continuity and discontinuity in response to the sensor's exposure to pulsating beam 172 from emitter 168. Sensor 164 pulsating indicates that vehicle 12 is at its proper target position, as shown in FIG. 31, thus controller 64 might direct parking display system 142 to provide a stop signal.

Figure 31:
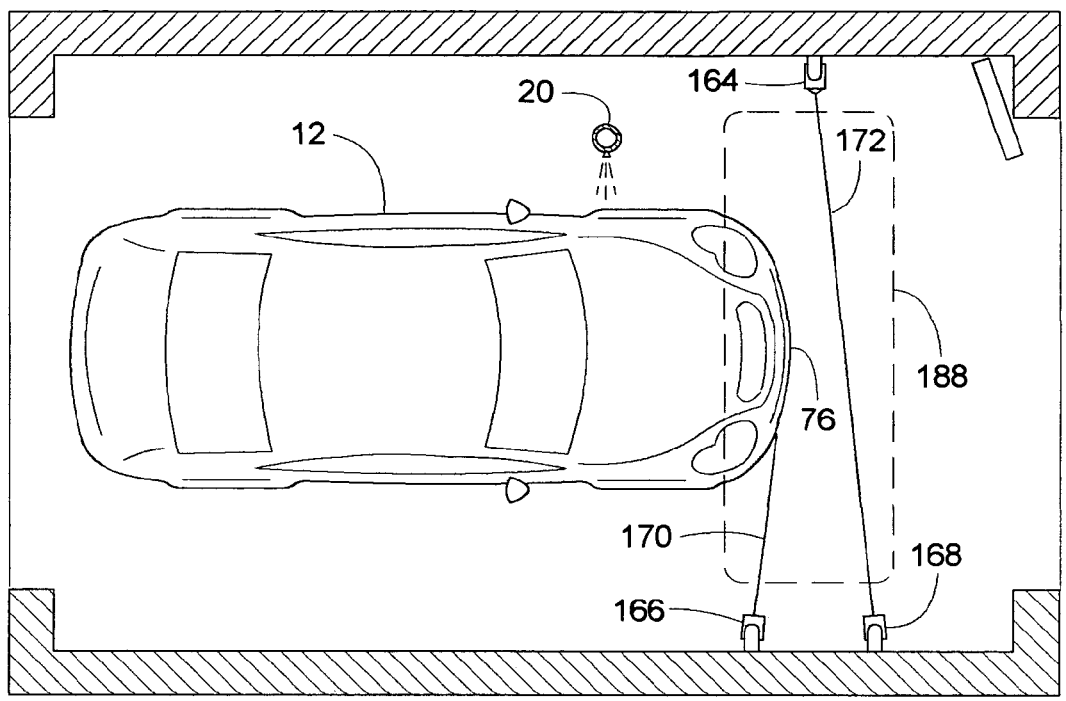
FIG. 31 is a top view similar to FIG. 29 but showing the vehicle being within a desired target position.
Figure 32:
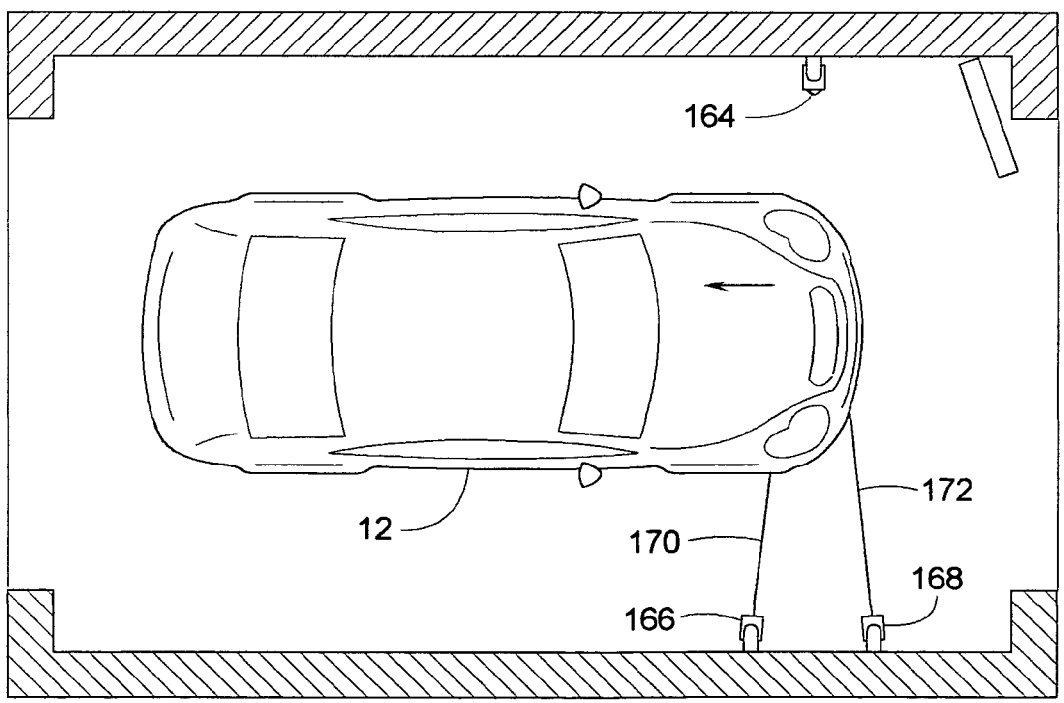
FIG. 32 is a top view similar to FIGS. 29 and 31 but showing the vehicle having driven past the desired target position.
Figure 33:
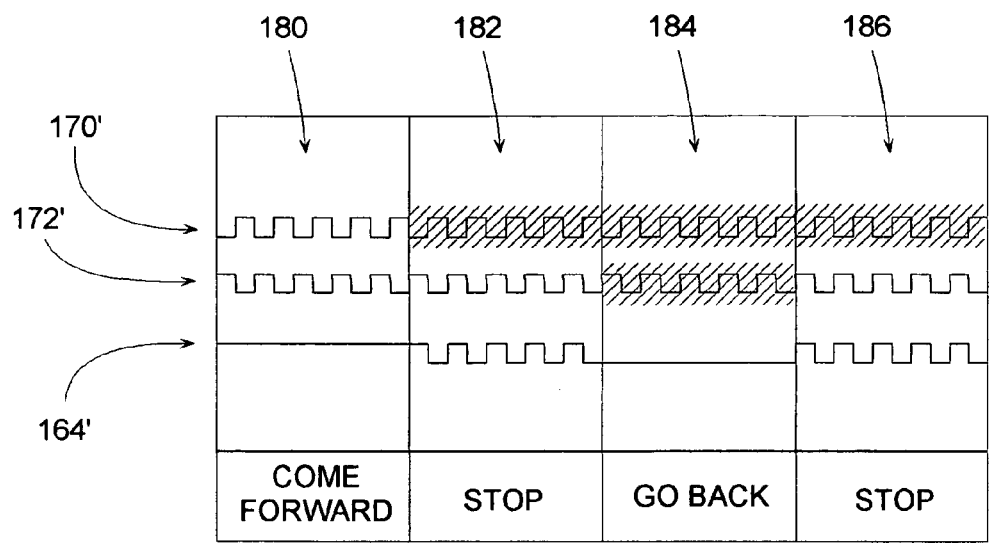
FIG. 33 is a graph showing a sensor's response in relation to multiple pulsating beams.

If vehicle 12 does not stop within the target position of FIG. 31, but instead continues moving forward to the position of FIG. 32, vehicle 12 would eventually obstruct both beams 170 and 172. This situation is depicted by column 184, which shows both pulsating beams 170 and 172 being obstructed and sensor 164 being in a state of discontinuity. Controller 64 can respond by directing display 142 to provide a back-up signal.

If the driver responds appropriately by moving vehicle 12 back from the position of FIG. 32 to that of FIG. 31, beam 172 remakes, which causes sensor 164 to resume pulsating, as shown in column 186. At this point, display 142 may once again provide the stop signal to encourage the driver to leave vehicle 12 at the desired target position.

Once vehicle 12 is at the target position for a predetermined period, such as five seconds or so, controller 64 provides a command signal 186 that commands a washing mechanism (e.g. arch 20) to begin washing vehicle 12.

To continue monitoring sensor 164 for the purpose of determining whether vehicle 12 moves from the target parking position during the wash cycle, controller 64 may need to periodically disregard sensor 164 when arch 20 or some other washing mechanism crosses one or both of the beams aimed at sensors 164. Controller 64, for example, could be programmed to disregard signal 178 from sensor 164 whenever spray arch 20 is within a predetermined zone 188 near beams 170 and 172. Informing controller 12 of when arch 20 is within zone 188 can be readily accomplished by providing controller 64 with a position feedback signal that indicates the position of arch 20, or controller 64 may already know the position of arch 20 because it is controller 64 itself that directs the movements of arch 20.

Figure 34:
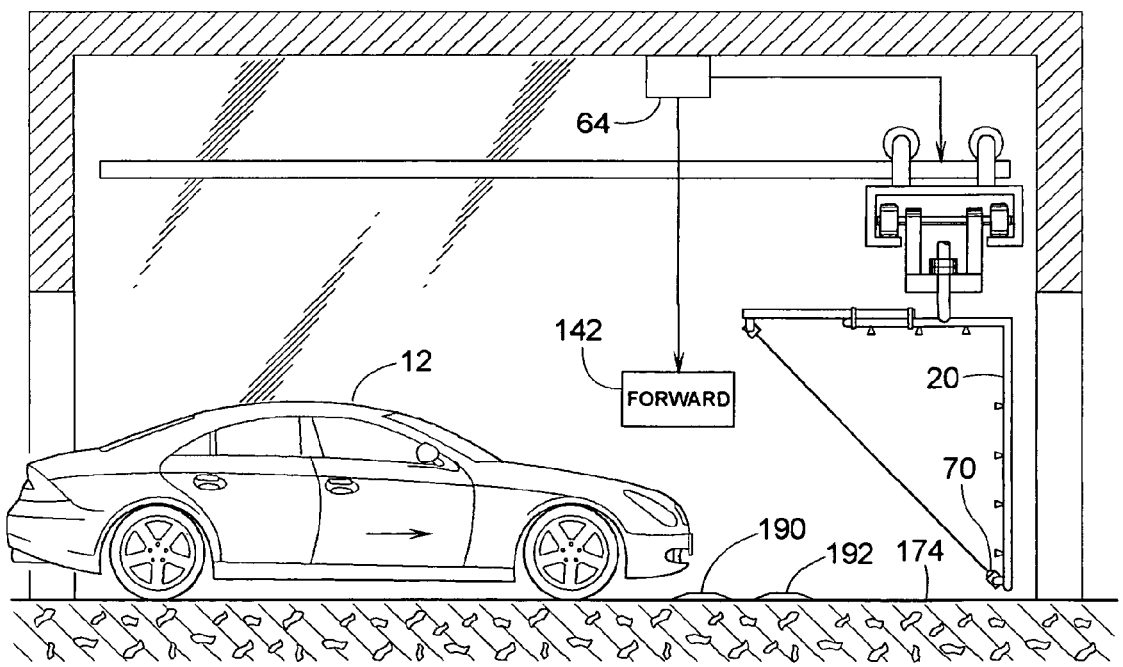
FIG. 34 is a side view of a vehicle entering a wash bay, wherein the figure shows a treadle alternative having two pressure-actuated switches.
Figure 35:
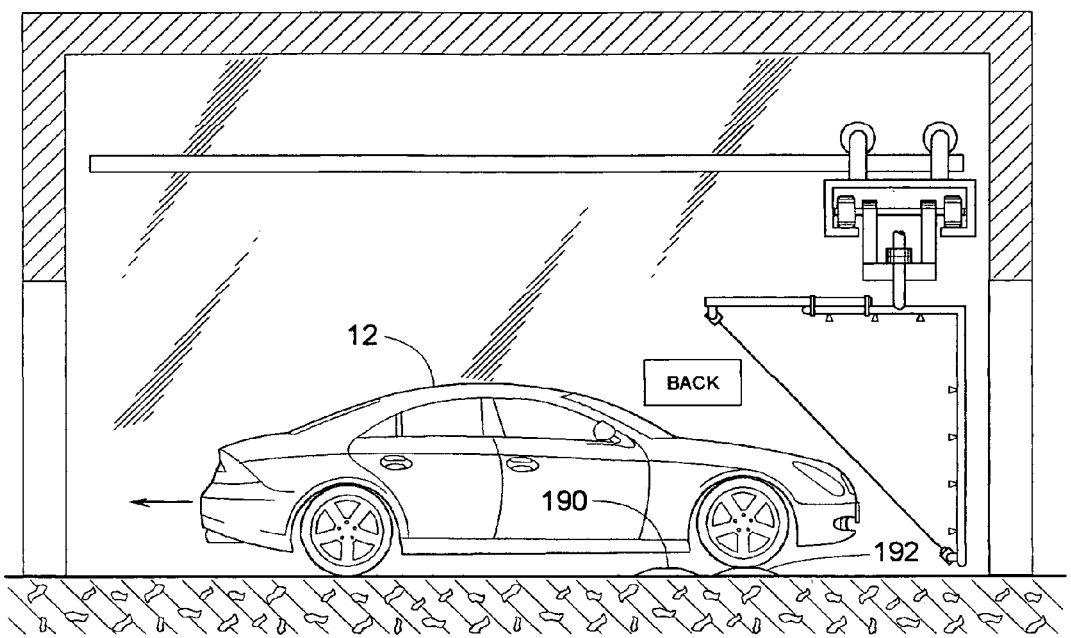
FIG. 35 is a side view similar to FIG. 34 but showing the vehicle having driven past the desired target position.
Figure 36:
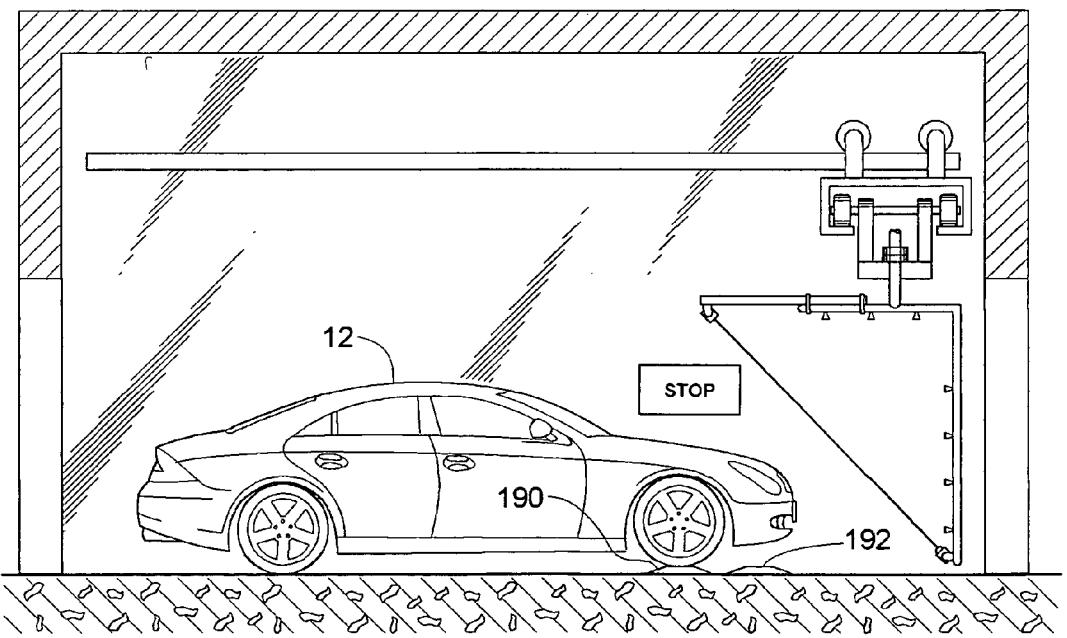
FIG. 36 is a side view similar to FIGS. 34 and 36 but showing the vehicle being within the desired target position.

In another embodiment, shown in FIGS. 34-36, a treadle alternative comprises a first pressure-actuated switch 190 and a second pressure-actuated switch 192 that are attached to a driveway 174 (floor of the wash bay). Switches 190 and 192 are actuated by applied pressure from vehicle 12.

In operation, parking display system 142 provides a drive-forward signal when neither pressure-actuated switch is actuated by vehicle 12. Display system 142 provides a stop signal when just first switch 190 is actuated. And display system 142 provides a back-up signal when only second switch 192 is actuated.

Once vehicle 12 seems to have stopped on first switch 190, controller 64 commands spray arch to begin washing vehicle 12. Sensor 70 is coupled to arch 20 in a manner similar to that described with reference to FIGS. 1-15 so that sensor 70 can help determine the locations of at least the vehicle's right side 72 and left side 74, thereby assisting in establishing a travel path for spray arch 20.

Although the invention is described with reference to a preferred embodiment, it should be appreciated by those of ordinary skill in the art that various modifications are well within the scope of the invention. Various embodiments of the spray arch system, for instance, can be used with various parking display systems including, but not limited to, those just described. Various embodiments of the spray arch system can be used with various treadles (virtual or otherwise) including, but not limited to, those just described. Likewise, various embodiments of the parking display system can be used with various spray arch, systems and other wash mechanisms including, but not limited to those just described. Various embodiments of the parking display system can be used with various treadles (virtual or otherwise) including, but not limited to those just described. Various embodiments of the treadle alternative can be used with various spray arch systems and other wash mechanisms including, but not limited to those just described. Various embodiments of the treadle alternative can be used with various parking display systems including, but not limited to those just described. Therefore, the scope of the invention is to be determined by reference to the following claims.

The invention claimed is:

1. A carwash for washing a vehicle in a wash bay, wherein the vehicle has at least four surfaces including a left side, a right side, a front end, and a back end, the carwash comprising:

an overhead supporting structure;

a trolley supported by the overhead supporting structure and being movable within the wash bay;

a spray arch extending downward from the trolley and being movable therewith, wherein the spray arch can rotate more than 180 degrees about an axis to spray the four surfaces;

a first emitter for projecting a first beam that may be interrupted by the vehicle, wherein the first emitter projects the first beam in a direction that lies at an acute angle with the axis about which the spray arch rotates;

a sensor being substantially fixed relative to the first emitter and being operable to change from a state of discontinuity to a state of continuity upon detecting the first beam, wherein the sensor provides a position feedback signal that indicates in which state the sensor is operating and is used to determine positions of both the right side and the left side, both the first emitter and the sensor are directly attached to the spray arch, whereby both the sensor and the first emitter move with the spray arch, the sensor and the first emitter are vertically and horizontally spaced apart from each other; and a controller connected to receive the position feedback position signal and provide a command signal in response thereto, wherein the command signal causes the spray arch to sequentially traverses the front end, the left side, the back end, and the right side, but not necessarily in that order.

2. The carwash of claim 1, wherein the sensor is also used to determine positions of the front end and the back end.

3. The carwash of claim 1, wherein the sensor remains in the state of discontinuity as the spray arch traverses a full length of the left side between the front end and the back end.

4. The carwash of claim 1, further comprising a second emitter for projecting a second beam that may be interrupted by the vehicle, wherein the sensor is operable in the state of continuity upon detecting the second beam.

5. The carwash of claim 4, wherein the first beam and the second beam pulsate out of phase with each other such that the sensor pulsates between the state of continuity and the state of discontinuity upon being in sight of just one of the first emitter and the second emitter, and the sensor remains primarily in the state of continuity upon being in sight of both the first emitter and the second emitter.

6. The carwash of claim 4, wherein the first beam and the second beam are projected so as to have a nonparallel relationship to each other.

7. The carwash of claim 1, wherein the command signal causes the spray arch to move such that the sensor remains in the state of discontinuity as the spray arch traverses a full width of the back end between the left side and the right side.

\* \* \* \* \*